United States Patent
Weller et al.

(10) Patent No.: US 7,827,115 B2
(45) Date of Patent: Nov. 2, 2010

(54) ONLINE PAYER AUTHENTICATION SERVICE

(75) Inventors: Kevin D. Weller, San Francisco, CA (US); Stephen W. Ryan, Half Moon Bay, CA (US); Peter R. Hill, Montecito, CA (US); Thomas J. Manessis, Pacifica, CA (US); Tony D. Lewis, Castro Valley, CA (US); Benedicto H. Dominguez, San Bruno, CA (US); Peter Bray, Castro Valley, CA (US); James Donald Reno, Scotts Valley, CA (US)

(73) Assignee: Visa International Service Association, Foster City, CA (US)

( * ) Notice: Subject to any disclaimer, the term of this patent is extended or adjusted under 35 U.S.C. 154(b) by 718 days.

(21) Appl. No.: 09/842,313

(22) Filed: Apr. 24, 2001

(65) Prior Publication Data
US 2002/0111919 A1   Aug. 15, 2002

Related U.S. Application Data

(60) Provisional application No. 60/199,727, filed on Apr. 24, 2000.

(51) Int. Cl.
*G06Q 99/00* (2006.01)
(52) U.S. Cl. .............. 705/78; 705/64; 705/72; 705/44
(58) Field of Classification Search ............. 705/50–79, 705/35–44
See application file for complete search history.

(56) References Cited

U.S. PATENT DOCUMENTS

| | | |
|---|---|---|
| 5,163,098 A | 11/1992 | Dahbura |
| 5,267,315 A | 11/1993 | Narita et al. |
| 5,420,926 A | 5/1995 | Low et al. |
| 5,442,342 A | 8/1995 | Kung |

(Continued)

FOREIGN PATENT DOCUMENTS

EP    0 896 284    2/1999

(Continued)

OTHER PUBLICATIONS

O'Mahony, Donal et al. "Electronic Payment Systems" (1997). Artech House, Inc., Norwood, MA. pp. 61-142.*

(Continued)

*Primary Examiner*—Jalatee Worjloh
(74) *Attorney, Agent, or Firm*—Beyer Law Group LLP

(57) ABSTRACT

A payment authentication service authenticates the identity of a payer during online transactions. The authentication service of the present invention allows a card issuer to verify a cardholder's identity using a variety of authentication methods, such as the use of passwords. Also, the only system participant requiring a certificate is the issuing financial institution. One embodiment of the invention for authenticating the identity of a cardholder during an online transaction involves querying an access control server to determine if a cardholder is enrolled in the payment authentication service, requests a password from the cardholder, verifies the password, and notifies a merchant whether the cardholder's authenticity has been verified. In another aspect of the invention, a chip card and the authentication service independently generate cryptograms that must match in order for the service to verify that the correct chip card is being used by the cardholder.

38 Claims, 16 Drawing Sheets

Payer Authentication Service (PAS) Architecture

U.S. PATENT DOCUMENTS

| | | |
|---|---|---|
| 5,485,510 A | 1/1996 | Colbert |
| 5,544,322 A | 8/1996 | Cheng et al. |
| 5,671,279 A | 9/1997 | Elgamal |
| 5,684,950 A | 11/1997 | Dare et al. |
| 5,712,913 A | 1/1998 | Chaum |
| 5,778,065 A | 7/1998 | Hauser et al. |
| 5,793,028 A | 8/1998 | Wagener et al. |
| 5,815,665 A | 9/1998 | Teper et al. |
| 5,826,241 A | 10/1998 | Stein et al. |
| 5,826,245 A | 10/1998 | Sandberg-Diment |
| 5,835,896 A | 11/1998 | Fisher et al. |
| 5,845,070 A | 12/1998 | Ikudome |
| 5,845,265 A | 12/1998 | Woolston |
| 5,883,810 A | 3/1999 | Franklin et al. |
| 5,884,272 A | 3/1999 | Walker et al. |
| 5,903,721 A | 5/1999 | Sixtus |
| 5,903,878 A | 5/1999 | Talati et al. |
| 5,903,882 A * | 5/1999 | Asay et al. .................... 705/44 |
| 5,909,492 A | 6/1999 | Payne et al. |
| 5,930,777 A | 7/1999 | Barber |
| 5,970,475 A * | 10/1999 | Barnes et al. ................ 705/27 |
| 5,991,738 A | 11/1999 | Ogram |
| 5,999,596 A | 12/1999 | Walker et al. |
| 6,016,476 A | 1/2000 | Maes et al. |
| 6,029,141 A | 2/2000 | Bezos et al. |
| 6,047,268 A | 4/2000 | Bartoli et al. |
| 6,052,675 A | 4/2000 | Checchio |
| 6,070,241 A | 5/2000 | Edwards et al. |
| 6,076,078 A | 6/2000 | Camp et al. |
| 6,078,902 A | 6/2000 | Schenkler |
| 6,098,053 A | 8/2000 | Slater |
| 6,122,624 A | 9/2000 | Tetro et al. |
| 6,167,378 A | 12/2000 | Webber, Jr. |
| 6,202,051 B1 | 3/2001 | Hill |
| 6,205,437 B1 | 3/2001 | Gifford |
| 6,236,981 B1 | 5/2001 | Hill |
| 6,243,691 B1 | 6/2001 | Fisher et al. |
| 6,247,129 B1 | 6/2001 | Keathley et al. |
| 6,260,024 B1 | 7/2001 | Shkedy |
| 6,270,011 B1 | 8/2001 | Gottfried |
| 6,327,578 B1 | 12/2001 | Linehan |
| 6,327,587 B1 | 12/2001 | Forster |
| 6,381,316 B2 | 4/2002 | Joyce et al. |
| 6,427,132 B1 | 7/2002 | Bowman-Amuah |
| 6,629,081 B1 | 9/2003 | Cornelius et al. |
| 6,675,153 B1 | 1/2004 | Cook et al. |
| 6,704,714 B1 | 3/2004 | O'Leary et al. |
| 6,735,572 B2 | 5/2004 | Landesmann |
| 6,820,202 B1 | 11/2004 | Wheeler et al. |
| 6,839,692 B2 | 1/2005 | Carrott et al. |
| 6,879,965 B2 | 4/2005 | Fung et al. |
| 6,889,325 B1 | 5/2005 | Sipman et al. |
| 6,931,382 B2 | 8/2005 | Laage et al. |
| 6,938,019 B1 | 8/2005 | Uzo |
| 6,941,282 B1 | 9/2005 | Johnson |
| 6,941,285 B2 | 9/2005 | Sarcanin |
| 7,069,249 B2 | 6/2006 | Stolfo et al. |
| 7,177,838 B1 | 2/2007 | Ling, Marvin T. |
| 7,177,849 B2 | 2/2007 | Fieschi et al. |
| 7,249,093 B1 | 7/2007 | King |
| 7,318,048 B1 | 1/2008 | King |
| 7,356,502 B1 | 4/2008 | LaBadie et al. |
| 2001/0014158 A1 | 8/2001 | Baltzley |
| 2001/0029496 A1* | 10/2001 | Otto et al. .................... 705/74 |
| 2001/0039535 A1 | 11/2001 | Tsiounis et al. |
| 2001/0042051 A1 | 11/2001 | Barrett et al. |
| 2001/0044787 A1 | 11/2001 | Shwartz et al. |
| 2001/0051902 A1 | 12/2001 | Messner |
| 2001/0054003 A1 | 12/2001 | Chien et al. |
| 2002/0007352 A1 | 1/2002 | Fieschi et al. |
| 2002/0019811 A1 | 2/2002 | Lapsley et al. |
| 2002/0023059 A1 | 2/2002 | Bari et al. .................... 731/201 |
| 2002/0069174 A1 | 6/2002 | Fox et al. |
| 2002/0091646 A1 | 7/2002 | Lake et al. |
| 2002/0128977 A1 | 9/2002 | Nambiar et al. |
| 2002/0169720 A1 | 11/2002 | Wilson et al. |
| 2002/0174062 A1 | 11/2002 | Sines et al. |
| 2002/0188574 A1 | 12/2002 | Niwa |
| 2003/0097451 A1 | 5/2003 | Bjorksten et al. |
| 2003/0120615 A1 | 6/2003 | Kuo |
| 2003/0144952 A1 | 7/2003 | Brown et al. |
| 2003/0149781 A1 | 8/2003 | Yared et al. |
| 2003/0200184 A1 | 10/2003 | Dominguez et al. |
| 2003/0208684 A1 | 11/2003 | Camacho et al. |
| 2003/0212642 A1 | 11/2003 | Weller et al. |
| 2004/0002903 A1 | 1/2004 | Stolfo et al. |
| 2004/0019563 A1 | 1/2004 | Sines et al. |
| 2004/0044627 A1 | 3/2004 | Russell et al. |
| 2004/0078328 A1 | 4/2004 | Talbert et al. |
| 2004/0083184 A1 | 4/2004 | Tsuei et al. |
| 2004/0177047 A1 | 9/2004 | Graves et al. |
| 2004/0230536 A1 | 11/2004 | Fung et al. |
| 2004/0243520 A1 | 12/2004 | Bishop et al. |
| 2005/0065855 A1 | 3/2005 | Geller |
| 2005/0131826 A1* | 6/2005 | Cook .......................... 705/44 |
| 2005/0192896 A1 | 9/2005 | Hutchison et al. |
| 2006/0143119 A1* | 6/2006 | Krueger et al. ................ 705/39 |
| 2006/0242058 A1 | 10/2006 | Torto |

FOREIGN PATENT DOCUMENTS

| | | |
|---|---|---|
| EP | 0 896 284 A | 2/1999 |
| EP | 1 271 435 A2 | 1/2003 |
| JP | 11-43780 | 11/1997 |
| JP | 10-313488 | 4/1998 |
| JP | 2000-184085 | 12/1998 |
| JP | 2000-236353 | 11/1999 |
| JP | 2000-076336 | 3/2000 |
| JP | 2001-313979 | 4/2000 |
| JP | 2001-344550 | 6/2000 |
| JP | 2000-142398 | 9/2000 |
| JP | 2001-291032 | 3/2001 |
| JP | 2002-91473 | 6/2001 |
| JP | 2003-044771 A | 4/2002 |
| JP | 2002-366784 A | 12/2002 |
| JP | 2002-109409 A | 2/2003 |
| JP | 2004-088534 A | 3/2004 |
| WO | WO 92/11598 | 7/1992 |
| WO | WO 99/42961 | 8/1999 |
| WO | WO 99/42961 A | 8/1999 |
| WO | WO 99/46881 | 9/1999 |
| WO | 00 67143 | 4/2000 |
| WO | WO /0045349 | 8/2000 |
| WO | WO 00/67143 | 11/2000 |
| WO | WO 01/07873 A2 | 2/2001 |
| WO | WO 01/13275 | 2/2001 |
| WO | WO 01/13275 A1 | 2/2001 |
| WO | 01 78493 A2 | 4/2001 |
| WO | 01 82190 | 4/2001 |
| WO | WO 01/37180 | 5/2001 |
| WO | WO 01/48628 | 7/2001 |
| WO | WO 01/63878 A1 | 8/2001 |
| WO | WO 01/67201 A2 | 9/2001 |
| WO | WO 01/69549 A1 | 9/2001 |
| WO | WO 01/78493 A | 10/2001 |
| WO | WO 01/78493 A2 | 10/2001 |
| WO | WO 01/78493 A2 | 10/2001 |
| WO | WO 01/99378 A | 12/2001 |
| WO | WO 02/03285 | 1/2002 |
| WO | WO 02/03285 A1 | 1/2002 |
| WO | WO 02/21464 | 3/2002 |
| WO | 03/090027 A2 | 10/2003 |
| WO | 2003/090027 A2 | 10/2003 |
| WO | WO 03/107242 A1 | 12/2003 |

WO WO 2004/079603 9/2004

OTHER PUBLICATIONS

Linn, "Practical Authentication for Distributed Computing," May 7-9, 1999, 1999 IEEE Computer Society Symposium on Research in Security and Privacy, Oakland, CA.
Sherman et al., "Secure Network Access Using Multiple Applications of AT&T's Smart Card," Sep./Oct. 1994, AT&T Technical Journal.
Leach, "Dynamic Authentication for Smartcards," 1995, Computers & Security, vol. 14, No. 5, pp. 385-389.
Ganesan, "The Yaksha Security System," Mar. 1996, Communications of the ACM, vol. 39, No. 3, pp. 55-60.
Zhou et al., "A Fair Non-Repudiation Protocol," May 6-8, 1996, 1996 IEEE Symposium on Security and Privacy, pp. 55-61 Oaldand, CA.
Bakker, "Mutual Authentication with Smart Cards," May 10-11, 1999, Proceedings of the USENIX Workshop on Smartcard Technology (Smartcard '99), pp. 63-74, Chicago, Illinois.
http://www.orbiscom.com, Jun. 30, 2000.
Dominguez et al., "Online Account Authentication Service," U.S. Appl. No. 10/156,271, filed May 24, 2002, 75 pages.
Dominguez et al., "Data Authentication and Provisioning Method and System," U.S. Appl. No. 10/660,263, filed Sep. 10, 2003, 26 pages.
Gerber et al., "Multiple Party Benefit from an Online Authentication Service," U.S. Appl. No. 10/838,719, filed May 3, 2004, 67 pages.
Dominguez et al., "Mobile Account Authentication Service," U.S. Appl. No. 10/370,149, filed Feb. 19, 2003. 81 pages.
United States District Court for the Northern District of Texas; Civil Action No. CIV 3-03CV0976-L; "Defendants' Preliminary Invalidity Contentions"; *Starpay.com, L.L.C.*, Plaintiffs vs. *Visa International Service Associate and Visa U.S.A. Inc.*, Defendants; May 28, 2004.
Supplementary European Search Report; Feb. 9, 2006; PCT/US 0328599.
International Search Report; PCT/US 03/28599.
U.S. Appl. No. 60/165546 and 60/165547.
Korean Patent Abstract; Publication No. 1020000012391 A; Mar. 6, 2000.
Office Action; U.S. Appl. No. 10/156,271; dated Aug. 23, 2004.
Office Action; U.S. Appl. No. 10/156,271; dated Feb. 11, 2005.
Office Action; U.S. Appl. No. 10/156,271; dated Jun. 24, 2005.
Office Action; U.S. Appl. No. 10/156,271; dated Dec. 20, 2006.
Office Action; U.S. Appl. No. 10/156,271; dated Aug. 23, 2007.
Office Action; U.S. Appl. No. 10/384,735; dated Aug. 20, 2007.
Office Action; U.S. Appl. No. 10/370,149; dated Dec. 28, 2006.
Office Action; U.S. Appl. No. 10/660,263; dated Jan. 24, 2005.
Office Action; U.S. Appl. No. 10/660,263; dated Jul. 20, 2005.
Office Action; U.S. Appl. No. 10/660,263; dated Feb. 10, 2006.
Office Action; U.S. Appl. No. 10/660,263; dated Jul. 31, 2006.
Office Action; U.S. Appl. No. 10/660,263; dated May 18, 2007.
Office Action; U.S. Appl. No. 10/838,719; dated Oct. 24, 2005.
Office Action; U.S. Appl. No. 10/838,719; dated Apr. 7, 2006.
Office Action; U.S. Appl. No. 10/838,719; dated Nov. 7, 2006.
Office Action; U.S. Appl. No. 10/838,719; dated Jul. 26, 2007.
Office Action dated Jan. 22, 2009 in U.S. Appl. No. 10/156,271.
Office Action dated Mar. 9, 2009 in U.S. Appl. No. 10/370,149.
Office Action dated Nov. 17, 2008 in U.S. Appl. No. 10/660,263.
Office Action dated May 13, 2009 in U.S. Appl. No. 10/838,719.
Office Action dated Jul. 14, 2008 in U.S. Appl. No. 10/838,719.
Office Action dated Feb. 6, 2009 in U.S. Appl. No. 10/838,719.
Office Action dated Sep. 12, 2008 in Patent Application No. 2003228574 AU.
Office Action dated Dec. 24, 2008 Patent Application No. 2004-80039179.6 CN.
Office Action dated Apr. 18, 2007 Patent Application No. 2006-03488-8 SG.
Office Action dated Feb. 10, 2009 Patent Application No. 2003-586704;JPO.
Office Action dated Nov. 10, 2009 Patent Application No. 2002-7014247; KR.
"Chambers"; Retrieved Nov. 3, 2008, 1pg. from http://www.credoreference.com/entry/1196447/.
Exhibit BB-15 to the statutory declaration of Bahram Boutorabi; Jan. 25, 2001.
Exhibit BB-16 to the statutory declaration of Bahram Boutorabi; Jan. 25, 2001.
Exhibit BB-18 to the statutory declaration of Bahram Boutorabi; Feb. 7, 2000.
Exhibit BB-19 to the statutory declaration of Bahram Boutorabi; Apr. 16, 2002.
Exhibit BB-20 to the statutory declaration of Bahram Boutorabi; May 2, 2002.
Exhibit BB-21 to the statutory declaration of Bahram Boutorabi; May 21, 2002.
Exhibit BB-22 to the statutory declaration of Bahram Boutorabi; Feb. 13, 2002.
Exhibit BB-23 to the statutory declaration of Bahram Boutorabi; Apr. 7, 2009.
Exhibit BB-24 to the statutory declaration of Bahram Boutorabi; Oct. 27, 1999.
Australian Opposition; "Statement of Grounds of Opposition and Particulars Relating to Each Ground"; Oct. 10, 2008; pp. 1-10.
Exhibit BB-4 to the statutory declaration of Bahram Boutorabi; Jan. 27, 2009.
Exhibit BB-5 to the statutory declaration of Bahram Boutorabi; Jan. 27, 2009.
Exhibit BB-6 to the statutory declaration of Bahram Boutorabi; Jan. 27, 2009.
Exhibit BB-7 to the statutory declaration of Bahram Boutorabi; Jan. 27, 2009.
Exhibit BB-8 to the statutory declaration of Bahram Boutorabi; Jan. 27, 2009.
Commonwealth of Australia Statutory Declaration of Bahram Boutorabi; Apr. 7, 2009.
Commonwealth of Australia Statutory Declaration of Andrew Weller; Apr. 6, 2009.
Office Action dated Mar. 21, 2008 in U.S. Appl. No. 09/842,313.
Office Action dated Feb. 12, 2008 in U.S. Appl. No. 10/156,271.
Office Action dated Sep. 5, 2008 in U.S. Appl. No. 10/660,263.
Office Action dated Dec. 11, 2007 in U.S. Appl. No. 10/370,149.
J. Kohl and C. Neuman; "The Kerberos Network Authentication Service (V5)," Sep. 1993; pp. 1-10, URL: http://www.ietf.org/rfc1510.txt, downloaded on Apr. 29, 2008.
Search Report from corresponding Singapore Application No. 200701817-9, mailed Jun. 23, 2008.
Written Opinion from corresponding Singapore Application 2007/01817-9, mailed Jun. 23, 2008.
Office Action dated Nov. 10, 2008 Patent Application No. 2002-7014247; KR.
Mexican Office Action dated May 15, 2009; Application No. PA/A/2006/006158.
Translation of Mexican Office Action dated May 15, 2009; App No. PA/A2006/006158.
Office Action dated Aug. 28, 2009 in the U.S. Appl. No. 10/660,263.
Office Action dated Aug. 17, 2009 in the U.S. Appl. No. 10/156,271.
Office Action dated Jun. 17, 2009 in the U.S. Appl. No. 12/034,606.
European Extended Search Report; Application No. 09150401.9-1238; Apr. 9, 2009.
Office Action dated Jun. 5, 2009 in U.S. Appl. No. 09/842,313.
Office Action dated Jun. 17, 2009 in U.S. Appl. No. 12/034,606.
Office Action dated Mar. 22, 2010 in U.S. Appl. No. 12/034,606.
Office Action dated Dec. 7, 2009 in U.S. Appl. No. 09/842,313.
Office Action dated Jan. 7, 2010 in U.S. Appl. No. 10/838,719.
Office Action dated Apr. 23, 2010 in Australian App. No. 2007203383.
Office Action entitled "Notification of Provisional Rejection"; Korean Intellectual Property Office; Korean Patent Application No. 10-2010-7003526; May 10, 2010.
Office Action entitled "Notification of Provisional Rejection"; Korean Intellectual Property Office; Korean Patent Application No. 10-2004-7016734; Feb. 26, 2010.

Office Action entitled "Notification of Refusal Ruling"; Korean Intellectual Property Office; May 28, 2009; Application No. 10-2010-7003526.
Office Action for Australian Patent Application 2007203383; dated Feb. 11, 2010.
Office Action for Japanese Patent Application 2007-511334 dated Mar. 9, 2010.
Examination Report of Application No. 09 150 401.9-1238; EPC; Feb. 11, 2010.
Examination Report of Application No. 200701817-9; Apr. 21, 2009; Singapore.
eBay. (Nov. 3, 1999). http://web.archive.org/web/19991103051532/http://www.ebay.com/. Retrieved online Aug. 18, 2004.
Supplementary European Search Report; Dated Mar. 31, 2005; European Patent Apl. No. 03726334.0.
Prince, "Online Auctions at eBay" (Apr. 1999). Prima Publishing Rocklin, CA.
Novell Debuts New Digitalme in the Net, Oct. 6, 1999, http://www.digitalme.com.
Office Action entitled "Notification of Provisional Rejection"; Korean Intellectual Property Office; Korean Patent Application No. 10-2010-7003526; May 10, 2010.
Office Action entitled "Notification of Provisional Rejection"; Korean Intellectual Property Office; Korean Patent Application No. 10-2004-7016734; Feb. 26, 2010.
Office Action entitled "Notification of Refusal Ruling"; Korean Intellectual Property Office; May 28, 2009; Application No. 10-2010-7003526.
Office Action for Australian Patent Application 2007203383; dated Feb. 11, 2010.
Office Action for Japanese Patent Application 2007-511334 dated Mar. 9, 2010.
Examination Report of Application No. 09 150 401.9-1238; EPC; Feb. 11, 2010.
Examination Report of Application No. 200701817-9; Apr. 21, 2009; Singapore.

* cited by examiner

Payer Authentication Service (PAS) Architecture

Cardholder Registration

300

Registration Page

Last 3 Digits of Account Number :

Security Information

Name :

City :

State :   ZIP:

Mother's Maiden Name :

Last 4 Digits of SSN :

List of Banks

Name on Card :

FIG. 3

Payment Transaction

Payment Transaction
Cardholder Password Promp

PAS Architecture and Payment Transaction

Centralized Enrollment Flow

Centralized Payment Flow

Distributed Enrollment Flow

Distributed Payment Flow

Chip Card Payer Authentication Service Architecture

Payer Authentication Service With Chip Card

Detailed Message Flow for
Payer Authentication Service
with Chip Card

PAS with Chip Card and
Universal Access Application

Integrated Payment Systems

ONLINE PAYER AUTHENTICATION SERVICE

This application claims priority of U.S. provisional patent application No. 60/199,727, filed Apr. 24, 2000 entitled "Visa Payer Authentication Service Description," which is hereby incorporated by reference.

FIELD OF THE INVENTION

The present invention relates generally to financial transactions, and more specifically to authenticating the identity of payers during online transactions.

BACKGROUND OF THE INVENTION

During a payment transaction using a payment card (e.g., a credit, debit, or stored value card), it is important to verify a cardholder's ownership of an account to avoid a variety of problems, such as unauthorized use. Payer authentication is the process of verifying a cardholder's ownership of an account. The most common method to authenticate a cardholder's ownership of an account occurs routinely at a point of sale during what is called a "card present" transaction. A card present transaction involves a merchant's representative taking the cardholder's card, swiping it though a payment card terminal to verify account status and credit line availability, and then checking to see that the signature on the back of the card matches the purchaser's signature. If the merchant follows specific guidelines for this type of transaction, the merchant will be guaranteed payment for the amount authorized less discount and fees. A service provider such as Visa International Service Organization (or service organization) may provide these specific guidelines.

"Card not present" transactions, on the other hand, such as those occurring online, through the mail, or over the telephone, involve payments that are not guaranteed to the merchant. No guarantee is provided primarily because the payers are not authenticated in such non face-to-face transactions, thereby allowing many risks to accompany the "card not present" transactions. Such risks involve issues such as chargebacks of payment transactions to online merchants, fraud for both merchants and cardholders, increased exception item processing expenses for banks, and an increased perception that buying goods and services online is not safe and secure, which may keep some consumers from buying online. Specific examples of risks include the unauthorized use of stolen account information to purchase goods and services online, fabrication of card account numbers to make fraudulent online purchases, and extraction of clear text account information from network traffic.

Given the continued expected high growth of electronic commerce, it is important to provide methods to authenticate payers. This will benefit all payment system participants including cardholders, merchants, and financial institutions. Authenticating the payer during online purchase transactions will reduce the levels of fraud, disputes, retrievals and chargebacks, which subsequently will reduce the costs associated with each of these events. Authenticating the payer also addresses consumer security concerns and therefore will lead to increased online sales. Prior systems used to authenticate consumers during online transactions have not been widely adopted because these systems were difficult to use, had complex designs, required significant up-front investment by system participants and lacked interoperability. Certain prior systems additionally required the creation, distribution and use of certificates by merchants, cardholders, issuers and acquirers. Such use of certificates is known to be quite burdensome.

In view of the foregoing, a system for authenticating the identity of the payer in an online transaction would be desirable. Such an authenticating system should be relatively easy to implement and use, require a minimal investment of resources, and provide a high level of interoperability between the system's participants.

BRIEF SUMMARY OF THE INVENTION

The present invention is directed towards an online service for authenticating the identity of a payer during online transactions. The present invention is relatively easy to implement and use, requires a minimal investment of resources to implement, and provides a high level of interoperability between the system's participants. The authentication service of the present invention allows a card issuer to verify a cardholder's identity using a variety of authentication methods, such as the use of passwords. Also, the only system participant requiring a certificate is the issuing financial institution. The authentication service can also provide authentication results to the merchant in real time during the checkout process.

In a first embodiment, the invention is directed toward the use of a traditional card, such as credit cards, debit cards, identification cards, etc. One aspect of the first embodiment pertains to a method for authenticating the identity of a cardholder during an online transaction. The method involves merchants querying a card issuer managed access control server to determine if said cardholder is enrolled in a payment authentication service, requesting a password from the cardholder, verifying said password, and notifying a merchant of the authenticity of the cardholder if the password entered by said cardholder is authenticated.

In a second embodiment, the invention is directed towards the use of an integrated circuit card (also known as a smart card or chip card). One aspect of the second embodiment pertains to a method for authenticating the chip card being used by a customer. This method involves verifying that said cardholder client device includes a chip card reader and then prompting said cardholder to enter said chip card into the chip card reader. After the chip card reader receives the chip card, the chip card generates a cryptogram which is then sent to the access control server. The access control server then independently generates a second cryptogram based upon information in the chip card and compares the chip card cryptogram to the second cryptogram. If the two independently generated cryptograms match, then the authenticity of the card is verified.

The service of the present invention presents many advantages. For example, the authentication service lays the foundation for establishing guaranteed payments for merchants involved with "card not present" transactions. Additionally, the authentication service will reduce chargebacks, frauds, and exception item processing. These and other features and advantages of the present invention will be presented in more detail in the following specification of the invention and the accompanying figures, which illustrate by way of example the principles of the invention.

BRIEF DESCRIPTION OF THE DRAWINGS

The invention, together with further advantages thereof, may best be understood by reference to the following description taken in conjunction with the accompanying drawings in which:

FIG. 3 illustrates one embodiment of an Internet web page in which a cardholder can enter information during the enrollment process for PAS.

DETAILED DESCRIPTION OF THE INVENTION

Figure 1:
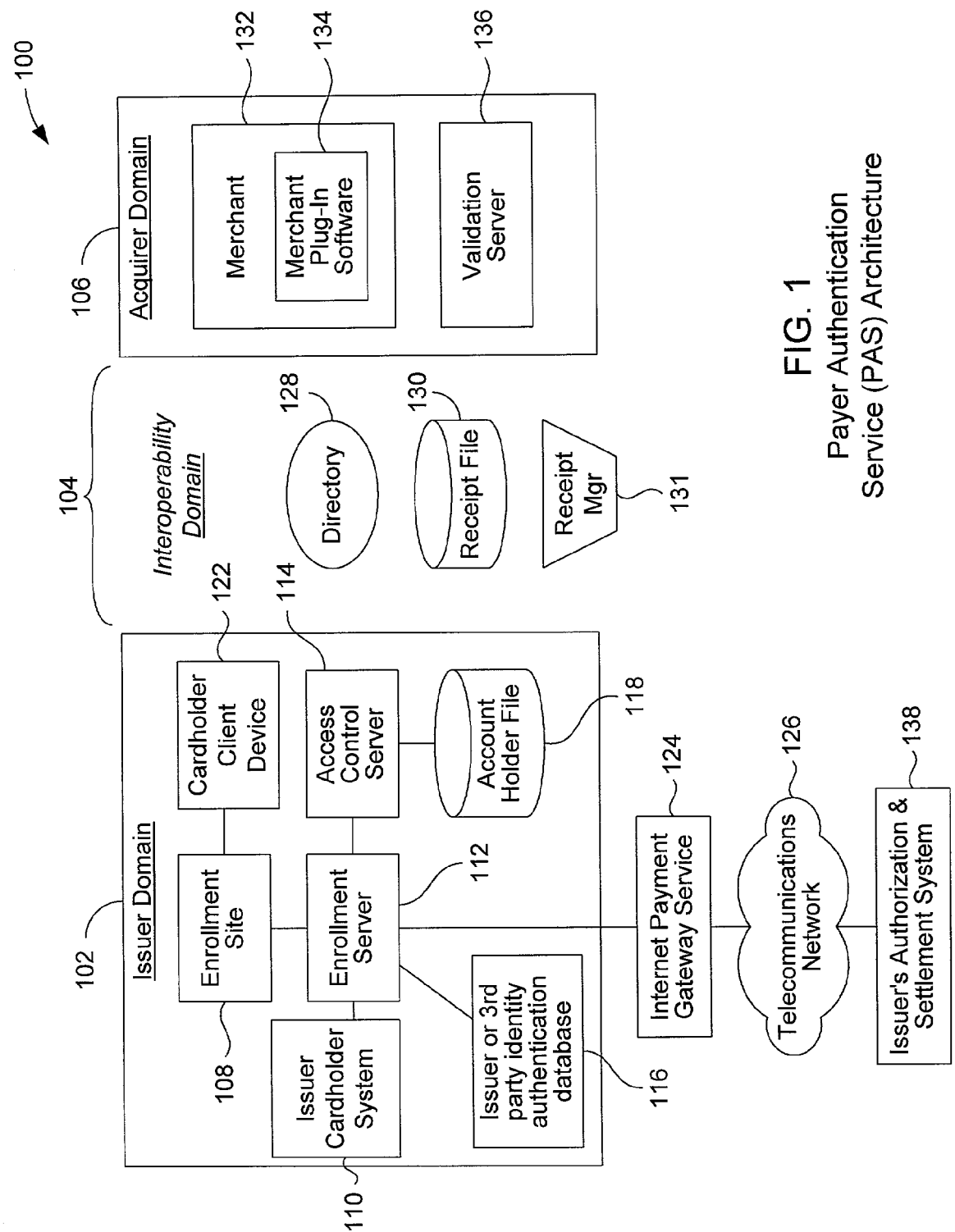
FIG. 1 schematically illustrates one embodiment of an infrastructure architecture that can support the Payer Authentication Service (PAS).

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known operations have not been described in detail so not to unnecessarily obscure the present invention.

To begin with, a high-level description of the authentication process used by the Payer Authentication Service (PAS) will be provided. Later in this disclosure, a more detailed description of the authentication process and other processes, such as system setup and customer registration and specific message flows, will be provided. As explained in the previous sections of this disclosure, PAS is designed to authenticate cardholder account ownership during online purchase transactions. PAS will be used, for example, when a cardholder shops online, adds items to a shopping cart, proceeds to the online merchant's checkout page, and completes the online merchants checkout forms. PAS can also be used in various transactions when a trusted party authenticates the identity of an individual or entity for the benefit of a third party. As is commonly known, the trusted party usually accepts legal responsibility for the authentication of the individual or entity to the third party. For example, PAS can be used to authenticate a financial institution's customers when accessing an Internet web site to complete an online form. PAS can also be used in aspects of retail banking such as debit cards, purchase cards, stored value cards, as well as wholesale banking, the medical business, the insurance business, the brokerage business, etc. ID cards can also be used with PAS. For example, AAA may use PAS to authenticate the identity of its customer, or a telephone card company can use PAS to authenticate the identity of the user of a specific card.

PAS can perform its authentication processes after the consumer decides to buy his or her desired products or services, for example, after the consumer clicks a "buy" button. PAS can also begin its authentication process at various other times in the consumer's purchase transaction, not only after the "buy" button is clicked. The authentication process is conducted mostly in a transparent mode to the consumer by utilizing software that has been incorporated in several points of a payment network. PAS validates participation by the cardholder and the cardholder's financial institution and then creates a window in which the consumer can confirm his or her identity by requesting a previously registered password from the cardholder. If the identity of the consumer is confirmed, the payment information and notice of the consumer's authentication is sent back to the merchant. Then, as conventionally performed, the payment transaction is processed by the merchant. For example, the merchant may send an order confirmation message to the cardholder's browser.

High Level System Description

FIG. 1 schematically illustrates one embodiment of an infrastructure architecture 100 that can support the PAS. The architecture is divided into three domains, the issuer domain 102, the interoperability domain 104, and the acquirer domain 106. The issuer domain 102 includes components that are primarily controlled by an issuer. An issuer, for example, can be a financial institution that issues payment cards to consumers. Specifically, an issuer, or a card issuer, personalizes new cards received from a card supplier and then issues these cards to its customers. Personalization may also be performed by the card supplier or by a personalization bureau. In addition to being a financial institution, an issuer may be any suitable issuing entity such as telecommunications network operator, a service association, a merchant or other organization, or even an agent acting for an issuer. The acquirer domain 106 includes components that are primarily controlled by an acquirer. An acquirer, for example, can be a financial institution that enrolls merchants in the payment scheme and manages the accounts of merchants. The acquirer also routes information from an online merchant to the telecommunications network. The interoperability domain 104 is supported by the Internet and includes components used by both the issuer and the acquirer. The interoperability domain 104 is typically managed by the card scheme manager such as Visa. The interoperability domain 104 can also be supported by a network other than the Internet.

The issuer domain 102 includes an enrollment site 108, an issuer cardholder system 110, the cardholder client device 122, an enrollment server 112, an access control server 114, an issuer or third party identity authentication component 116, and an account holder file 118. Optionally, the issuer domain 102 can include an issuer file of approved cardholders 120. The enrollment server 112 is a computer that manages cardholder enrollment into the PAS service through presenting a series of questions via a web interface to be answered by the cardholder and verified by the issuer. As shown in FIG. 1, the card issuer operates the enrollment server 112. However, a service organization, such as Visa, may operate the enrollment server 112 on behalf of the issuer. The issuer may use a web-enabled, interactive "identity authentication service" provided by a third party during the enrollment process to help validate a cardholder's identity. The enrollment server 112 is connected via the Internet to the Internet Payment Gateway Service 124, which is in turn, connected to a telecommunications network 126, for example, VisaNet. The Internet Payment Gateway Service 124 allows the enrollment server 112 to communicate with the telecommunications network 126. The connection via the Payment Gateway Service 124 allows the enrollment server 112 to query the issuer's authorization system 138 to determine if a cardholder being enrolled has an active card account. Enrollment site 108 is an Internet web site where the cardholder can register to participate in the PAS.

The access control server (ACS) 114 is a computer that has a database of cardholders registered for PAS containing cardholder account and password information. During an online payment transaction, the access control server 114 provides digitally signed receipts to merchants, controls access to PAS, and validates cardholder participation in the service. The card issuer or a service organization, such as Visa, on behalf of the issuer may operate the access control server 114. While PAS does not require any additional cardholder software to be used, optional cardholder software and hardware may be deployed. The cardholder software may be used to support additional authentication techniques such as digital certificates, integrated circuit cards (chip cards) and chip card reader, or to verify that the ACS is properly associated to the appropriate cardholder client device. Account holder file 118 is a issuer managed database for storing information relating to the cardholders that are successfully enrolled in PAS.

Cardholder client device 122 is used by the cardholder to participate in PAS. Specifically, the cardholder client device 122 can be any device capable of accessing the Internet, such as a personal computer, mobile telephone, a personal data assistant, or an interactive cable television.

The issuer cardholder system 110 is an issuer controlled system containing information about cardholders. This system information contains information concerning account information, services utilized by the cardholder, etc. Some of the information within the issuer cardholder system can be used in the process for enrolling cardholders in the PAS.

Issuer or third party identity authentication database 116 contains information that the issuer or third party already has on file regarding cardholders. Database 116 is used by issuer in the process of enrolling cardholders to verify the identity of the cardholders. For instance, information entered by cardholders during the PAS registration process must match the information already on file in the authentication database 116 in order for cardholders to successfully register for PAS. Third parties can be companies such as Equifax.

The interoperability domain 104 includes a directory server 128, a receipt file 130 and a receipt manager 131. Directory server 128 routes authentication requests from merchants to specific access control servers. The directory server 128 is operated by a service organization, such as Visa. The receipt file 130 and receipt manager 131 store signed receipts for each authenticated purchase transaction. The receipt file 130 contains information that verifies which transactions were authenticated and provides additional information during dispute resolution processes. The receipt file 130 and receipt manager 131 are operated by a service organization. The issuer, Acquirer, or merchant may also maintain a copy of the digitally signed receipt.

Acquirer domain 106 includes the merchant 132 and the validation server 136. A merchant plug-in software module 134 resides at the location of the merchant 132. The merchant plug-in software module 134 is a PAS software module that integrates into a merchant's electronic commerce web sites. The plug-in software module 134 provides the interface between the PAS and the merchant's payment processing software. The validation server 136 verifies the digital signature of the card issuer used to sign the receipt returned by PAS to the merchant during the payment transaction. In alternative embodiments of the present invention, the functionality of the validation server 136 may be included within the merchant plug-in software module 134, thus eliminating the need for a separate validation server 136. The validation server 136 is operated by the merchant, the acquirer or by a service organization.

The infrastructure of the PAS may be implemented in two separate architectural approaches. One approach is a centralized architecture and the second is a distributed architecture. The centralized approach requires no software or data to be stored on the cardholder's client device. In the distributed architecture, on the other hand, PAS software exists on the cardholder's client device. This software is downloaded by the enrollment server to the cardholder client device during the enrollment process. In the distributed approach, the merchants determine a cardholder's participation in the PAS through a mechanism provided by the cardholder's system client device. It should be noted that a vendor, a PAS software supplier, could choose to create the centralized, distributed, or a combination of the two architectures depending upon the vendor's or their customer's specific business requirements. FIGS. 7-10 will provide further detail as to centralized and distributed architectures.

As mentioned earlier, the distributed architecture requires software to be stored on the cardholder client device. The distributed PAS provides a mechanism for a cardholder to transfer payment applications and persistent data from one cardholder client device to another cardholder client device. This mechanism provides PAS with the ability to authenticate a cardholder's identity when the cardholder client device is a different client device from the client device that the cardholder accessed during the registration process. The PAS system is also capable of authenticating the cardholder's identification when the current cardholder's client device is one that the cardholder had not used previously. In other words, cardholders can use PAS on more than one client device. At least two methods exist for transferring the PAS software between cardholder client devices. The first method involves a cardholder using a portable storage medium, such as a floppy disk, to transport the software. The second method involves the ACS dynamically downloading the software onto the additional client device to be used by the cardholder.

In some embodiments, PAS can interoperate with other cardholder applications, such as electronic wallets, and PAS can operate compatibly with electronic commerce mark-up language (ECML Software). PAS also provides capabilities to implements dispute resolution procedures. For instance, the PAS allows the merchant to retain sufficient information to provide proof of cardholder authentication for the purposes of dispute resolution and chargebacks.

Set-Up, Registration, Authentication and Authorization Detailed Description

The description will now provide further detail regarding the various phases from setting up of the PAS to the actual authorization of online transactions. First, the procedures required to set up the various system participants such that they may operate within the PAS will be explained. Then the cardholder's process for registering with the PAS will be explained. After these phases are described, explanation will be provided as to the actual authorization of payment transactions.

Setting up the PAS involves set up procedures for all the participants within the system. These participants include entities such as the merchants, financial institutions, and cardholders. First, the set up procedures of the online merchants and financial institutions will be described, and then the set up procedures for cardholders will be described.

Online merchants who sign up with the PAS receive merchant plug-in software modules, such as plug-in software module 134 in FIG. 1. The plug-in software module should be specific to the computing platform and commerce server software used by the merchant. Financial institutions participating within PAS will provide bank logos and marketing designs to be incorporated into their customized PAS enrollment site template. Acquirers should also provide merchants with a service organization certification authority (CA) root certificate, a service organization certification authority SSL certificate for client authentication, and integration support.

Before an Issuer can be set up to use PAS they must obtain a copy of all PAS software specified in the Issuer domain and install hardware systems and the PAS software. Then, Issuer financial institutions will also provide identity authentication policies and participating BIN information to PAS to be used in cardholder identity verification processes. Optionally, the issuer can provide to the PAS the cardholder authentication information for pre-loading into the account holder file 118. Pre-loading facilitates large volume support of cardholders. For example, when an issuer desires to activate all or most of its cardholders for PAS, the issuer can send PIN numbers to all of its cardholders. The PIN number can then be used by each cardholder to access his or her preloaded passwords. In this manner, the enrollment process is expedited because each cardholder need not go through the formal PAS enrollment process. After the cardholders use their preloaded password for the first time, the cardholders have the option of designating a new and easier to remember password.

Cardholder authentication information includes information such as business identification, country code, card account number, card expiration date, cardholder name, issuer-specific authentication data specified in the "participating BIN" data (e.g., mother's maiden name), and other information such as billing address, shipping address, social security number, telephone number, account balance, transaction history, and driver license number. Issuers should also provide account number ranges for their card account portfolios and access control server IP addresses (URLs) to the directory server. PAS will be offered through bank branded web-sites, which will allow cardholders to register with PAS.

Figure 2:
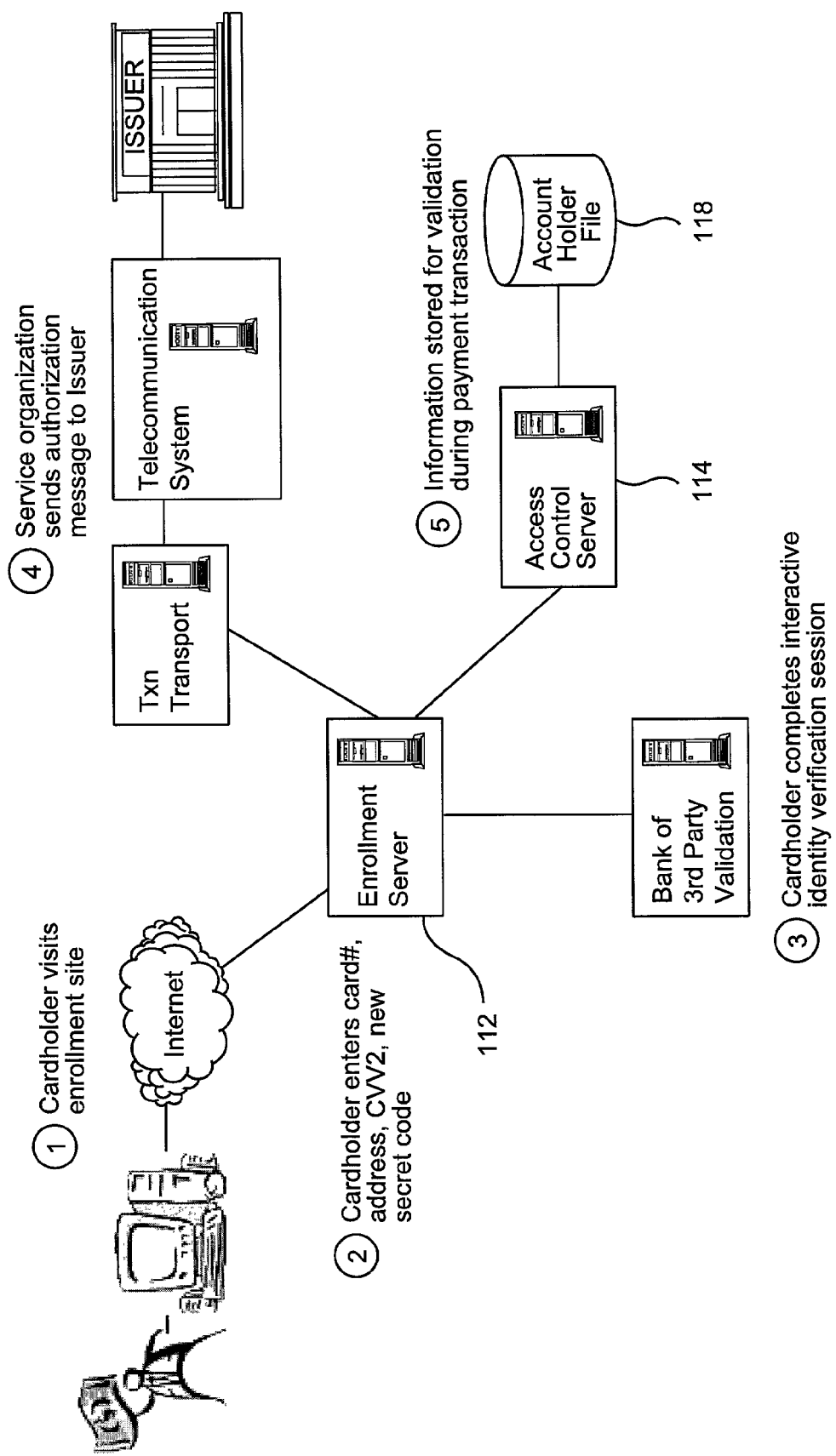
FIG. 2 illustrates the process through which a cardholder registers with PAS according to one embodiment of the present invention.

FIG. 2 illustrates the process through which a cardholder registers with PAS according to one embodiment of the present invention. As shown in step 1, cardholders visit an enrollment server Internet web site maintained by a financial institution, such as an issuer. Cardholders register with PAS by registering their credit card account numbers. Alternatively, cards such as check and debit cards may also be registered. Also, cardholders may register one or more cards with PAS. As shown at step 2, the cardholder enters information such as a cardholder primary account number (PAN), name and card expiration date. Additional information may also be entered by the consumer at this point. For instance, address, e-mail address, shopper identification, an account verification value, cardholder-specific password, and issuer-specific authentication information may also be entered by the cardholder. This information can be entered in a page at the enrollment web site such as page 300 shown in FIG. 3.

After the cardholder enters the requested information at the enrollment site 108, PAS verifies that the cardholder PAN falls within a card range that is registered by the issuer in the directory server 128 of the Interoperability domain 104. The PAS can verify cardholder identities using various methods. First, as just mentioned, the PAS can verify the cardholder identity through a third party authentication database or through the issuer's own authentication database. Additionally, verification can be performed by using the issuer provided file of approved cardholders 120, by transmitting status check authorizations to the issuer, and by comparing responses to pre-loaded information provided by financial institutions.

If the PAN is not within an issuer enrolled card range, the enrollment is rejected and the enrollment process is terminated. If the PAN is within an enrolled card range, an authorization for one dollar will be submitted through a service organization payment network, such as VisaNet, to the issuer financial institution. The authorization of the one-dollar transaction allows the issuer to verify the card account status, verify the address using the Address Verification Service, and verify the Cardholder Verification Value 2 (CVV2). The CVV2 is a three-digit number printed on the signature strip on the back of the payment cards.

If the card is approved, then at step 3, the cardholder will then be prompted for additional authentication information to verify the cardholder's identity in an interactive, real-time, online session. In some embodiments of the present invention, the cardholder can also be requested to enter a password and a "hint question and response" pair that will be used to authenticate the cardholder during the purchase transaction.

As shown in step 4, when the cardholder's identity is verified and the appropriate responses are returned, PAS sends an authorization message to the issuer financial institution. Then at step 5, the enrollment server 112 passes cardholder information to the access control server 114 to set up records in the account holder file 118. The account holder file, such as account holder file 118 in FIG. 1, can store information such as: financial institution BIN numbers, account numbers, expiration dates, first and last names, driver's license numbers, billing addresses, social security numbers, cardholder passwords, cardholder password questions, cardholder password answers, cardholder email addresses, third party identity scores, and other information.

In some embodiments of the present invention, during the registration process, the cardholder can be asked to enter a phrase, called the personal assurance message (PAM), that is recognizable to the cardholder. PAM is later presented to the cardholder by the issuer during a payment transaction. Since only the issuer knows the cardholder's designated PAM, the cardholder can be assured that a dialog window used with PAS was delivered from the cardholder's issuer. An example PAM is, "the sky is blue."

It should be noted that cardholders require no new client software or devices to use PAS. In some cases however, chip card implementations of PAS may require additional cardholder components such as a chip card reader. In a preferred embodiment, the consumer registration process utilizes security protocols such as SSL channel encryption to protect data transmitted across the internet between the cardholder and the enrollment server.

Also, during the consumer registration or enrollment process, each financial institution may display its own "terms of use" and/or "data privacy policy." Each financial institution has the ability to require registering cardholders to either accept or not accept the terms and policies in order to complete the registration process. The version numbers of the "terms of use" and/or the "data privacy policy" accepted by each consumer should be saved by the financial institutions.

Figure 4:
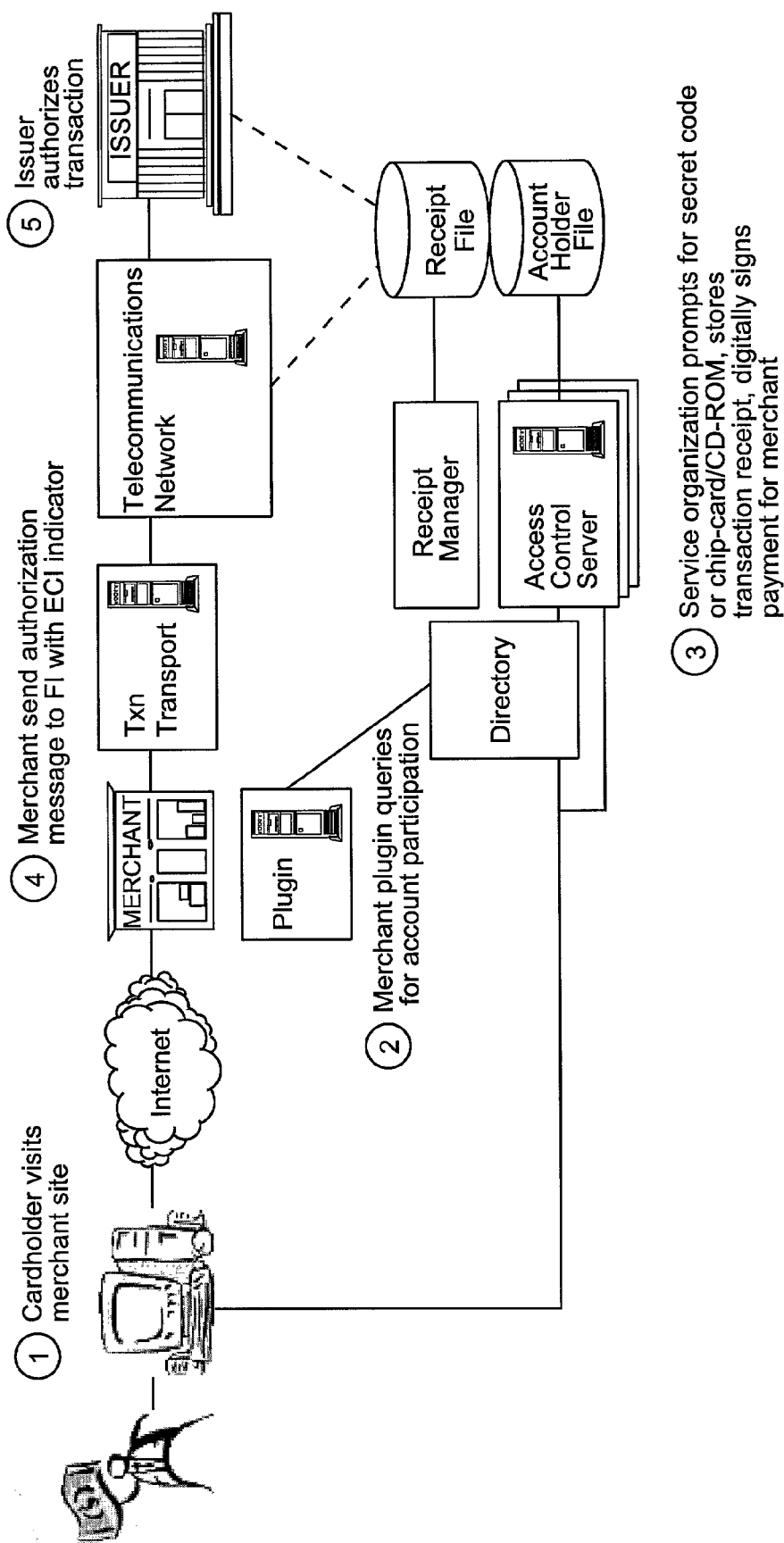
FIG. 4 illustrates a PAS authenticated payment transaction according to one embodiment of the present invention.

After PAS system participants are set up and the cardholders are registered, a payment transaction may be authenticated utilizing PAS. A PAS authenticated payment transaction is illustrated in FIG. 4. In step 1 of FIG. 4, a cardholder visits a merchant's electronic commerce site on the Internet. After the cardholder selects the products or services he or she wishes to purchase, the cardholder begins the checkout process, completes the checkout form, and then clicks on a "buy" button.

After the "buy" button is selected, as shown in step 2 of FIG. 4, the merchant plug-in software module is activated and then performs a verification process to determine whether the cardholder's specific account is registered with the PAS. There are various methods by which the merchant plug-in software module can determine if the cardholder is registered with PAS. For instance, a two-step process in which the directory server and then the ACS accociated with the cardholder is checked, a process where only the ACS is checked, and a method in which the merchant can check a cache memory containing the same information held in the directory server.

A description of the two-step process will now be provided. In the first step, the merchant plug-in software module identifies the card account number and queries the directory server 128 to verify that the account number is within a range of numbers associated with an issuer bank that is a PAS participant. If the account number does not fall within a range of account numbers defined on the directory server 128, then the issuer and thereby its cardholder are not registered with the PAS. In this case, the merchant is notified that the account number is not registered with PAS and the merchant plug-in software module returns control of the transaction back to the merchant storefront software. At this point, the merchant storefront software can proceed with the transaction, as it normally would, refuse further service to the cardholder, or proceed with alternative payment methods.

On the other hand, if the account number is determined to be within a range of account numbers present in directory server 128, then the second step of the verification process begins. The second step of the verification begins by the directory sending the ACS capable of authenticating the cardholder the card number to determine if the card is enrolled. If the card is not enrolled, the enrollment process is terminated. If the ACS indicates that the card is enrolled, the ACS via the directory server returns its URL Internet address to the merchant plug-in. The merchant plug-in then invokes the ACS via the cardholder client device and its resident browser. Once again it is noted that there can be multiple ACS's in PAS.

A second method of checking to see if the cardholder is registered with PAS is for the merchant plug-in software module to directly query the ACS without first querying the directory server. The third method, as mentioned above, is for the merchant to have a cache memory containing the same information held at the directory server. In this manner, the merchant can at least do a preliminary check.

It should be noted that there could be more than one physical directory server in the PAS system. However, it is preferable that there be only one logical directory server. In other words, all of the directory servers should be consistent in that they contain the same information.

Figure 5:
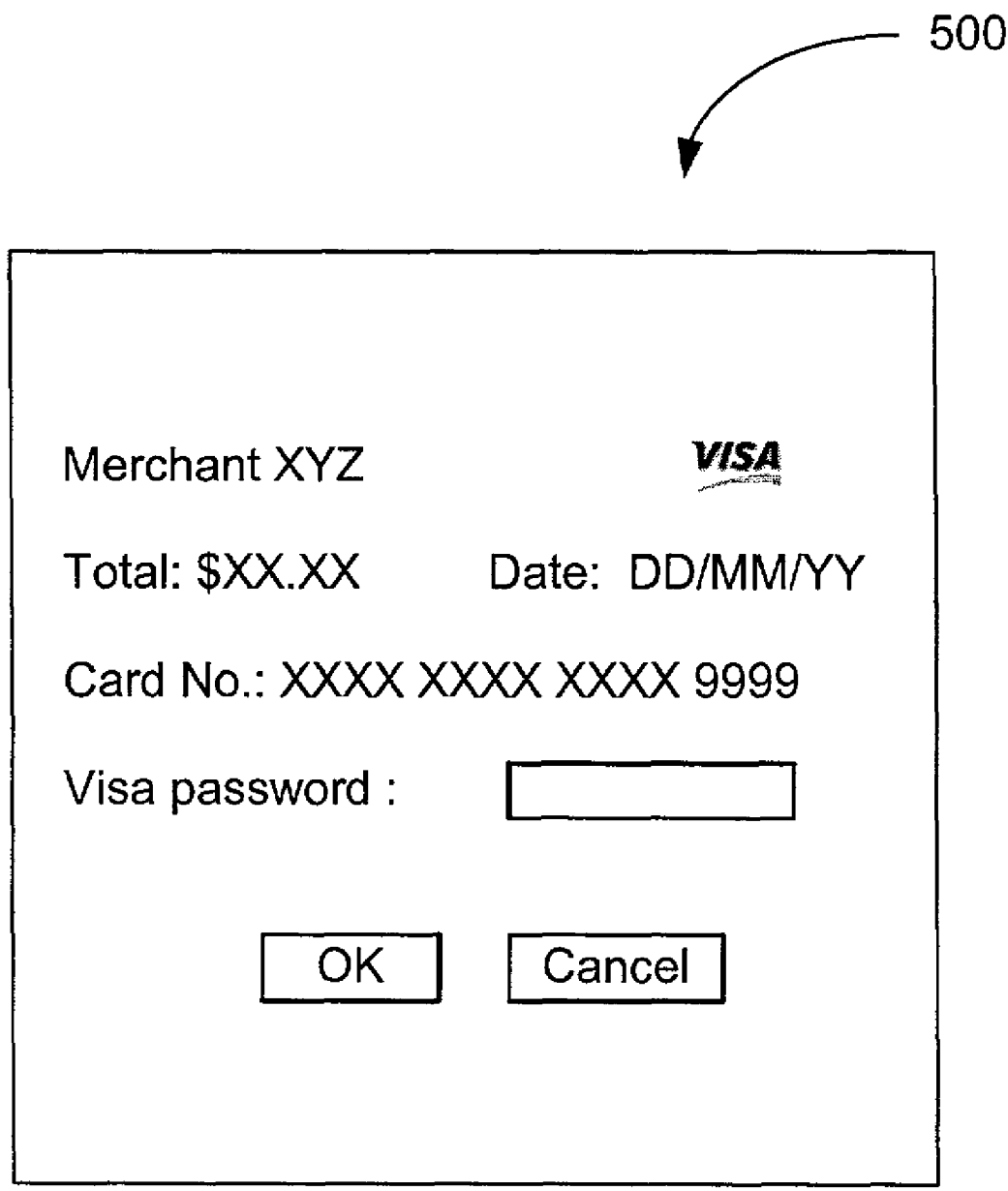
FIG. 5 illustrates an exemplary window that prompts the cardholder for his or her password.

If the cardholder is a PAS participant, the ACS displays a bank branded window to the cardholder. The bank branded window contains basic payment transaction information and prompts the cardholder for his PAS password. See FIG. 5 for an exemplary window 500 that prompts the cardholder for his or her PAS password. The cardholder enters his or her password and the ACS verifies the password. As is common today, the cardholder can be given a certain number of attempts to correctly enter the password. If the cardholder is unable to correctly enter the password, then the cardholder can be prompted with the hint question that was established during the cardholder's registration process. Preferably, the cardholder is given one chance to enter the correct answer in response to the hint question.

The payment authentication continues if the correct password is immediately entered or if the correct response is provided by the cardholder to the hint question within the allowed number of attempts. The ACS then proceeds to digitally sign a receipt using the issuer's signature key or a service provider's key. This receipt will contain the merchant name, card account number, payment amount, and the payment date. The receipt file 130 stores the following transaction data: merchant name, merchant URL, card account number, expiration date, payment amount, payment date, the issuer payment signature and the cardholder authentication verification value. The ACS then redirects the cardholder back to the merchant plug-in through the cardholder browser. At this point, the ACS also passes to the merchant the digitally signed receipt and the determination as to whether the cardholder has been authenticated. The validation server 136, in the acquirer domain 106, is used by the merchant plug-in 134, to verify the digital signature used to sign the payment receipt. After verifying the digital signature, the cardholder is deemed "authenticated." In some embodiments of the invention, after the transaction is completed, the cardholder will also have the ability to re-register his or her card account and create a new password to be used for future online purchases.

After the cardholder is authenticated in step 3, step 4 initiates the process for authorizing the specific cardholder's account. Specifically, in step 4, the merchant, through the merchant plug-in software module, sends an authorization message to a payment network such as VisaNet. The payment network, in turn, forwards the authorization message and the ECI to an issuer financial institution. The authorization message is a message as is commonly known in the art. The authorization message is sent to the issuer so that the issuer financial institution can verify to the merchant that a specific account is in good standing and has adequate credit line for the requested purchase amount of the payment transaction. The ECI indicates that the transaction was completed over the Internet and indicates that level of message security (i.e., channel encryption (SSL), in the clear) and authentication used.

In alternative embodiments of the invention, the merchant is capable of providing additional information along with the authorization message. For instance, the following information can also be sent: a flag indicating if the cardholder was successfully authenticated, account information, digital signatures, a cardholder verification value 2, card authentication verification value (CAVV), an offline PIN authenticated by chip card EMV cryptogram, and the necessary fields to provide the merchant with guaranteed payment. The CAVV is data is created by the ACS which authenticated the cardholder and is a unique value for a given payment card and a specific payment transaction from that card. It is used by PAS card issuers to uniquely identify authenticated payment transaction if any subsequent disputes occur. After the issuer financial institution processing of the authorization transaction is complete, control of the purchase transaction is then returned to the merchant's storefront software via the payment network. The issuer then returns the authorization response via the payment network to the merchant. In step 5 of FIG. 4, the issuer financial institution will either authorize or decline the transaction. In some embodiments, the authorization messages can be batched and sent in a group at a later time. The PAS authentication information is also included in the batch authorization messages.

The access control server 114 is capable of various other functions. For example, the access control server can deactivate registered accounts from the database. Accounts can be deactivated manually, by the cardholder, or by the issuer. The access control server 114 can also provide a simplified renewal registration process when the cardholder receives a replacement card. The access control server 114 can support multiple users of the same registered account with unique access control information. When providing a user with a connection to the access control server 114 for purchase transactions or account updating, the access control server 114 can validate the user as an authorized cardholder of the registered account through one or more of the following mechanisms: pass phrase, digital signatures, an online PIN number, or and off-line PIN authentication by chip card EMV cryptogram.

In the PAS, the merchant 132 can interoperate with existing systems where the merchant has the cardholder account information on file, interoperate with existing merchant authorization and clearing systems, support third parties who provide services to multiple merchants, support a variety of payment interfaces between the merchant and the acquirer, and minimize the mandatory impact to payment network authorization messages from the acquirer when setting the value of the electronic commerce indicator (ECI).

One method for routing transactions from the merchant to an access control server is to have a directory that provides the address of the server based on the cardholder account number. In such a method, the PAS requests for routing information is only acceptable from authenticated merchants. If PAS detects and reports activity from a merchant that exceeds its normal activity, then PAS is able to deny access to a merchant whose acquirer indicates that such access is no longer valid. This could be the case when merchant fraud is deemed probable. Merchant authentication to the PAS system can be deployed, but deployment is not required. Merchant authentication can help minimize merchant fraud.

Detailed Message Flow for PAS Payment Transactions

Figure 6:
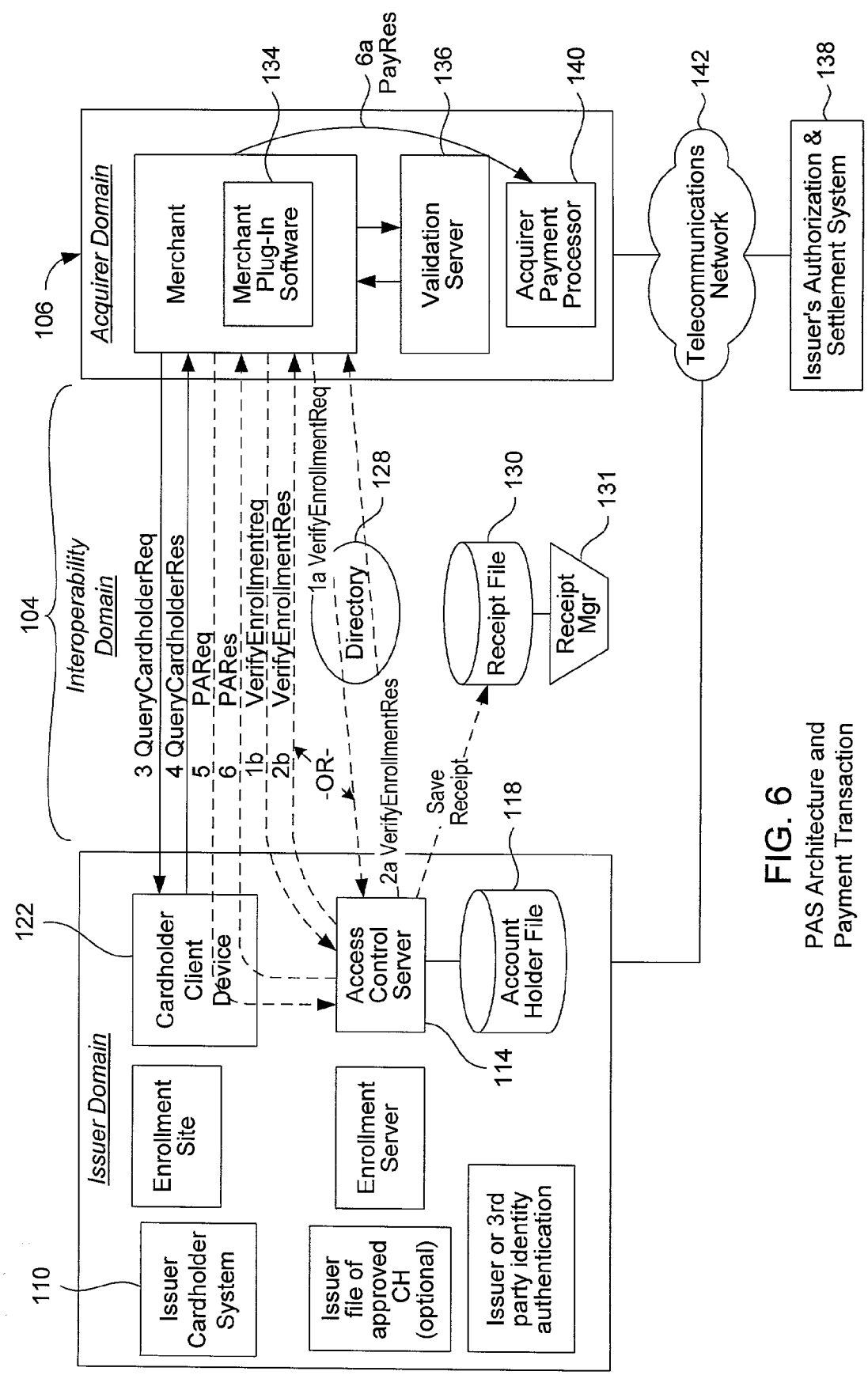
FIG. 6 illustrates exemplary messages that are sent during the payment transaction superimposed over the PAS architecture.

FIG. 6 illustrates exemplary messages that are sent during the payment transaction superimposed over the PAS architecture. As described above, the purchase transaction begins when a cardholder visits a merchant website via a browser and selects items to purchase. The merchant's payment system will ask the cardholder to enter his or her payment information. Generally, entry of the payment information should occur in a secure environment, for example, through the use of SSL encryption protocol. When the cardholder indicates that he or she is ready to finalize the transaction, the merchant's payment system invokes the PAS merchant plug-in software module 134. Then as shown by line 1*a*, the plug-in software module 134 checks the directory server 128 for the specific URL of the ACS that may contain the cardholder's Payer Authentication Number (PAN) to validate that the cardholder is enrolled in the service. Alternatively, the plug-in software module 134 checks its own cache memory that contains this information. The software 134 searches for the PAN by formatting a VerifyEnrollmentReq message using the cardholder PAN. If not already established, the merchant plug-in software 134 will establish a secure connection with and authenticate itself to the directory server 128 or the access control server 114. The merchant plug-in software 114 will search for a card range entry that corresponds to the cardholder PAN at various locations. One place that is searched is the merchant plug-in software cache of directory information. The merchant plug-in software module can also check the directory server and the access control server.

After the merchant plug-in software 114 conducts the search, the VerifyEnrollmentReq message is transmitted to the access control server 114 either directly, as shown by line 1*b*, or after first passing through the directory server 128, as shown by line 1*a*. When the VerifyEnrollmentReq message is transmitted to the access control server 114 via the directory server 128, the directory server 128 searches for a record corresponding to the cardholder PAN contained in the VerifyEnrollmentReq message. On unsuccessful match, the directory server 128 will format a VerifyEnrollmentRes message with no URL value(s) and set the value of Status of PAN Enrollment or VerifyEnfollmentRes-Status to "N." The VerifyEnrollmentRes message is then returned to the merchant plug-in software. On the other hand, upon successful match, the directory server 128 will, if not already established, establish a secure connection with and authenticate itself to the access control server URL. Then, the VerifyEnrollmentReq message is forwarded to the access control server URL. If that URL is not available, the merchant plug-in should proceed to the next access control server URL value (if available), and allow for up to a maximum of up to five access control server URL's to be searched. Of course, the number of URL's attempted is variable. If unsuccessful on all attempts, a VerifyEnrollmentRes message is returned to the merchant plug-in with VerifyEnrollmentRes-Status set to "N" to indicate to the merchant that the purchase transaction cannot be processed as a PAS transaction.

After the VerifyEnrollmentReq message is received by the access control server 114, the access control server accepts the cardholder PAN from the VerifyEnrollmentReq message and validates it against the account holder file 118. The access control server 114 then formats a VerifyEnrollmentRes message. In the case where a successful match occurs, the access control server sets the Status of PAN Enrollment to "Y," creates a single use proxy PAN, which the access control server 114 will internally associate with the PAN, and populates the URL field(s) in the VerifyEnrollmentReq message. In the case of an unsuccessful match, the access control server sets the Status of PAN Enrollment to "N." Then, as shown by line 2*a*, the access control server returns a VerifyEnrollmentRes message back to the merchant plug-in through the directory server 128. For the case when a VerifyEnrollmentReq message is transmitted directly to the access control server, the VerifyEnrollmentRes message is transmitted directly back to the merchant plug-in as shown in line 2b.

Caching of the directory server 128 can be facilitated by utilizing a CRReq and CRRes message pair. The CRReq message is sent from the merchant plug-in module to the directory server and requests the list of participating card ranges, in order for the plug-in module to update its cache. The CRRes message is the response containing the participating ranges.

After the issuer access control server returns the VerifyEnrollmentRes message, the PAS system checks to see if the cardholder client device has distributed authentication capabilities by using a QueryCardholderReq and QueryCardholderRes message pair. The merchant plug-in will format and send a query, the QueryCardholderReq message, to the cardholder client device 122 to determine if a distributed PAS cardholder module is resident. Sending of the QueryCardholderReq message is shown in FIG. 6 by line 3. If any distributed authentication options are returned in the QueryCardholderRes message, the merchant plug-in will communicate directly with the PAS cardholder client software to perform the authenticated steps. Sending of the QueryCardholderRes message is shown in FIG. 6 by line 4.

If the VerifyEnrollmentRes-Status has a value not equal to "Y," then the merchant is notified that the purchase transaction cannot be processed as a PAS transaction. However, if the VerifyEnrollmentRes-Status has a value of "Y," then the merchant plug-in will format a payment request message, PAReq. The merchant plug-in will send the PAReq message via the cardholder client device browser to the issuer's ACS server, as is shown by line 5.

Additionally, by using the QueryCardholderReq and QueryCardholderRes messages, the VerifyEnrollmentReq and VeirfiyEnrollmentRes messages may be eliminated. Cardholder client software could be deployed with issuer's ACS URL embedded in the software. The merchant plug-in will complete the QueryCardholderReq and QueryCardholderRes messages first. If PAS cardholder client software is detected, the Payer Authentication Request (PAReq) message could be sent to the ACS or the cardholder client software without having to conduct the VerifyEnrollmentReq and VerifyEnrollmentRes messages.

After the merchant plug-in passes the Payer Authentication Request (PAReq) to the issuer's ACS, the ASC displays a window to the cardholder. The window displays the payment details contained in the Payer Authentication Response (PARes) in addition to other items such as: a Issuer's logo, a service organization mark or brand logo, merchant name, merchant location (URL), total purchase amount and currency, purchase date, card number, installment/recurring payment terms, order description or link to description, special terms and conditions of sale or link to this information, personal assurance message (PAM), and prompt for the cardholder's password.

The ACS will then prompt the cardholder to enter the appropriate password. The ACS accepts the cardholder input and validates it against the account holder file 118. The PAS will allow, for example, a number of unsuccessful attempts (e.g., three attempts) to enter the correct password. Of course, the number of attempts allowed can be varied. After the final unsuccessful attempt, the PAS will display the hint question. The cardholder will need to enter the correct hint question response. The hint question associated with the cardholder is then displayed. The cardholder is provided at least one attempt to enter the correct response. If the cardholder provides an incorrect response, merchant can be notified that PAS transaction cannot be completed. If the cardholder provides the correct response, the transaction should be treated as if the password was matched. Note, if there is more than one entry for an account number, the various cardholder names are displayed in a drop down window. The cardholder can then select his or her name.

Upon matching of the password, the ACS generates and digitally signs a payment response message, PARes. The ACS also generates and sends a SaveReceipt message to the receipt file 130 and receipt manager 131, as is shown by line 7. As shown by line 7a, the SaveReceipt message may also be passed from the receipt file 130 to the issuers authorization and settlement system 138 to allow the issuer to match up the payment authorization request with the payer authenticated transaction in real time. Sending the SaveReceipt message to the issuers authorization and settlement system 138 allows the issuer to determine simultaneously if the authorization request is for an authenticated purchase. The ACS will then re-direct the signed PARes back to the merchant server plug-in, as is shown by line 6.

After signed PARes is transmitted back to the merchant plug-in, the plug-in is reactivated. If the authentication status is a "Y," the plug-in sends the PARes to the validation server 136. In the case that the validation server functions are provided by the merchant plug-in, the merchant plug-in validates the PARes signature and returns the result of the signature validation. If the signature cannot be validated, the merchant plug-in will notify the merchant the transaction cannot be treated as a PAS transaction. If the authentication status is a "N," the merchant should send a prompt to the cardholder asking for additional information, request the cardholder to use a different payment card or form of payment, or process the payment transaction as a non-authenticated payment transaction.

In the case that the acquirer domain 106 contains a validation server, the validation server 136 validates the signature on the PARes. The validation server 136 then returns the result of the signature validation to the merchant plug-in. On the other hand, if the signature is validated, the merchant proceeds with an authenticated payment authorization. The PARes message may also be passed from the merchant to its acquirer payment processor 140 as shown in line 6a. The PARes message may then be passed from the acquirer through a telecommunications network 142 to the issuer. Thus, the payer authentication results are made available to the issuer as part of the standard payment authorization process.

Now the security issues related to the various channels of transmission will be discussed. As a base-line, all the channels of transmission are preferably encrypted using 128-bit SSL. The channel between the cardholder and the merchant includes two channels. The merchant should secure the connection that is used when the cardholder enters the payment information by using an SSL certificate obtained from a service organization-approved certificate authority. The merchant should also secure the connection used to transport the PARes message from the cardholder to the merchant plug-in by using an SSL certificate obtained from a service organization-approved certificate authority.

The channel between the cardholder and the ACS should be encrypted by the ACS by using an SSL certificate obtained from a service organization-approved certificate authority. This channel is used for two purposes. First to send the PAReq message from the merchant plug-in to the ACS, and secondly to send the signed PARes message from the ACS to the cardholder.

The channel between the cardholder and the enrollment server should be encrypted by the enrollment server using an SSL certificate obtained from a service organization-approved certificate authority. This channel is used to accept the cardholder enrollment information.

The channel between the merchant and the directory server, and between the directory server and the ACS server should be secured through a service organization-issued SSL encryption certificate in order to protect the PAN data contained in the VerifyEnrollmentReq and VerifyEnrollmentRes messages and the ACS URL address contained in the VerifyEnrollmentRes message.

The channel between the ACS to the cardholder should be encrypted to protect the prompt for the cardholder's password and the cardholder entered password. This channel should be protected with an SSL certificate obtained from a service organization-approved certificate authority.

Centralized and Distributed Architecture Embodiments

Figure 7:
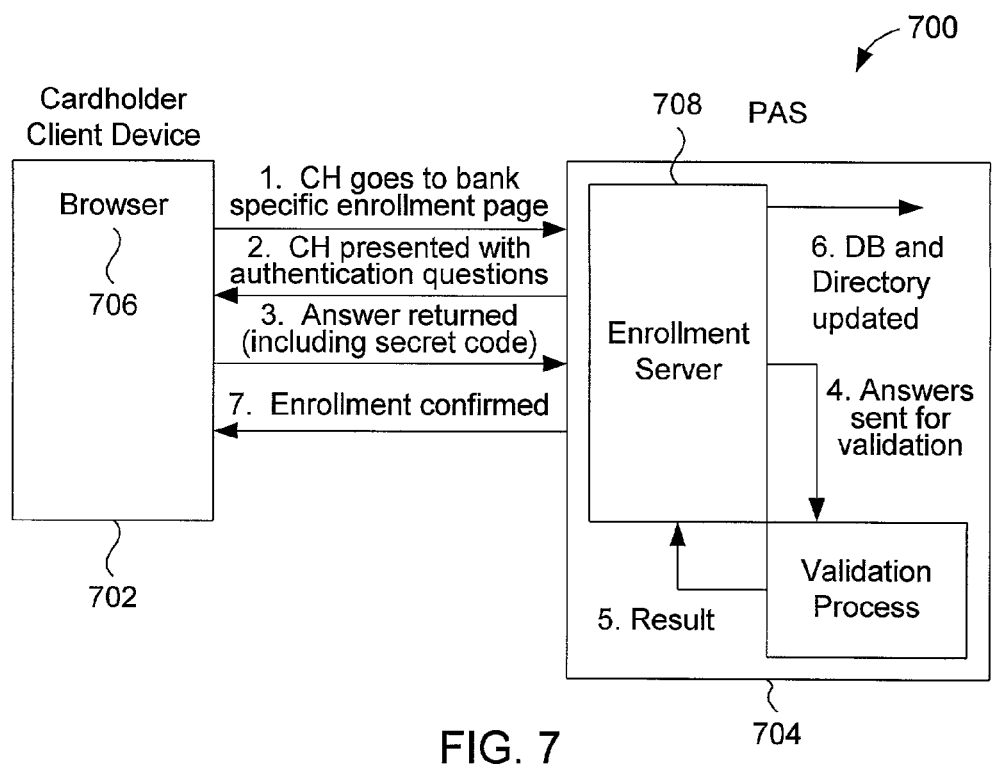
FIG. 7 illustrates the message flows on the centralized PAS architecture according to a centralized embodiment of the present invention.
Figure 8:
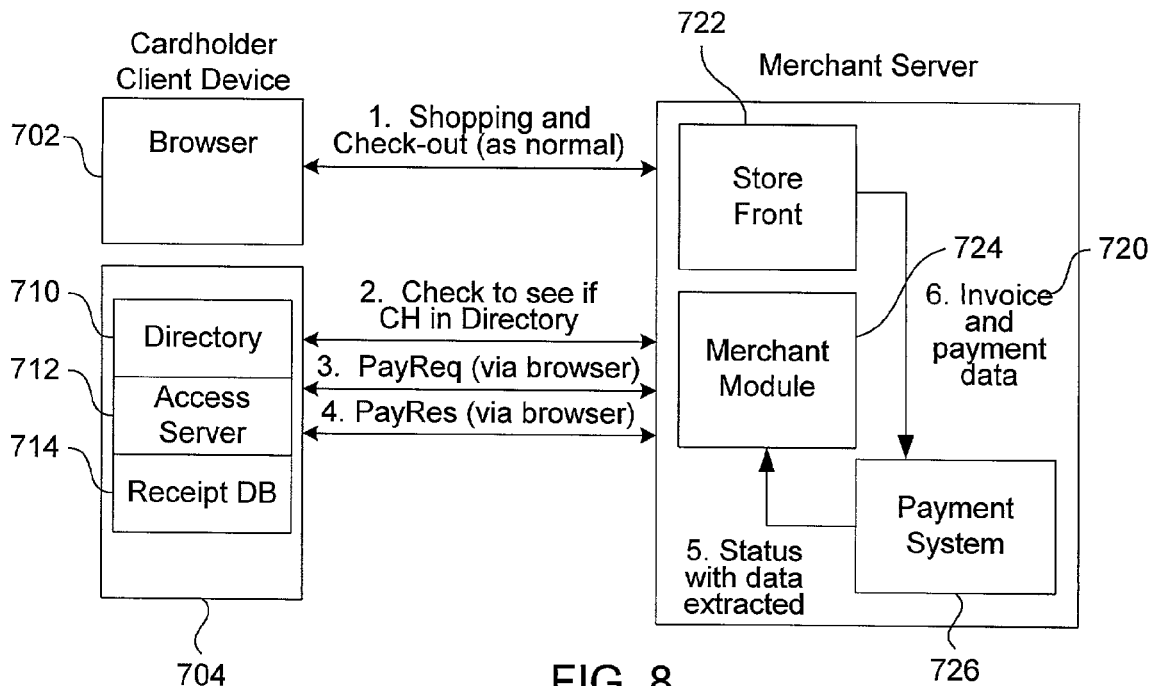
FIG. 8 illustrates the centralized payment flow that occurs between the cardholder client device, the PAS, and the merchant system, according to the centralized embodiment of the present invention.
Figure 9:
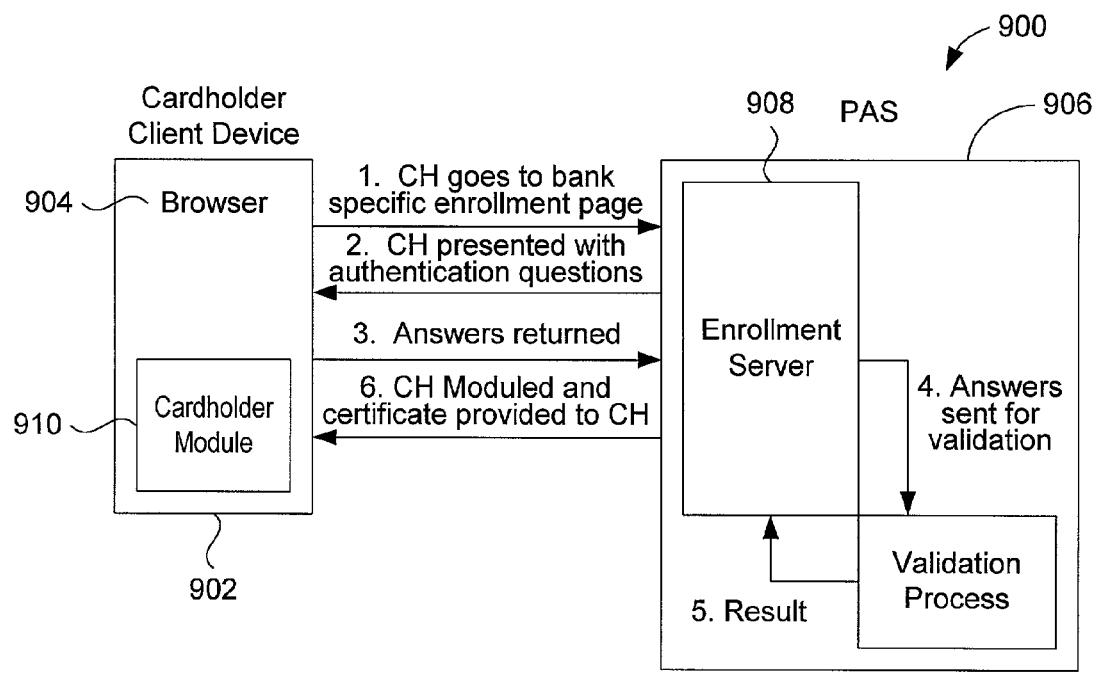
FIG. 9 illustrates the enrollment flow in the distributed PAS architecture according to a distributed embodiment of the present invention.
Figure 10:
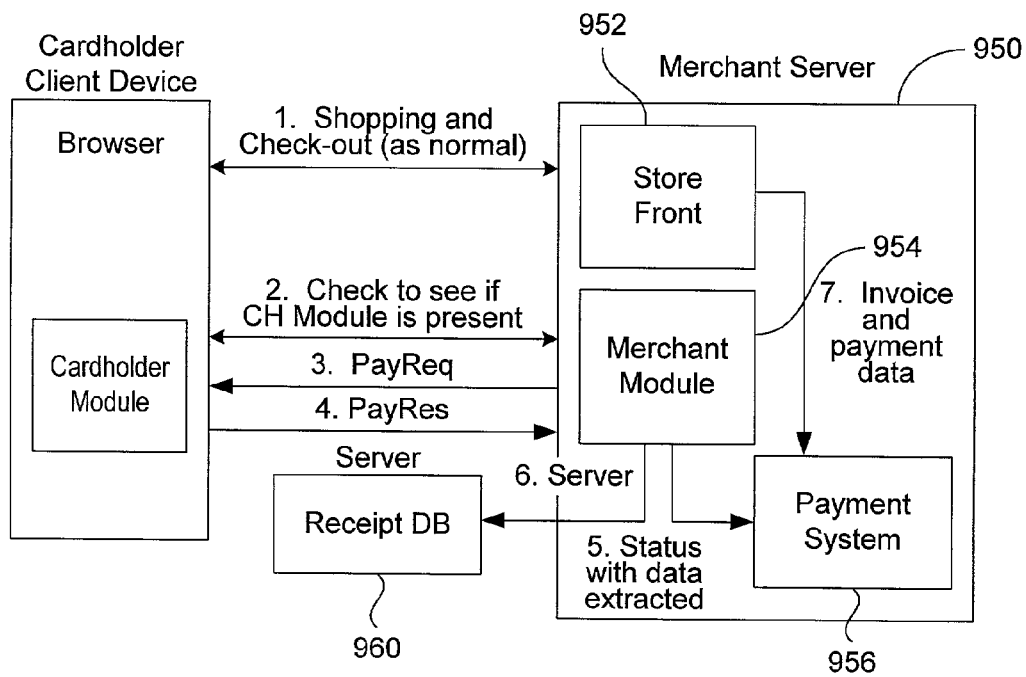
FIG. 10 illustrates the payment flow in the distributed PAS architecture according to the distributed embodiment of the present invention.

FIGS. 7 and 8 illustrate a centralized architecture and FIGS. 9 and 10 illustrate a distributed architecture. FIGS. 7-10 also show the superimposed representations of the message flows during both the enrollment and payment processes.

FIG. 7 illustrates the message flows on the centralized PAS architecture according to one embodiment of the present invention. As previously mentioned, the centralized approach requires no software or data to be stored on the cardholder's system and the cardholder's password is stored at a central data storage site (AHF). The centralized architecture 700 consists of a cardholder client device, for example, a personal computer (PC) 702, and the PAS 704. The cardholder client device 702 supports an Internet browser 706 that allows the cardholder to access PAS. PAS 704 includes at least an enrollment server 708. The various other components of the PAS system have not been illustrated so not to unnecessarily complicate the representation of the centralized architecture. The centralized enrollment process begins at step 1 when the cardholder goes to the bank Internet site and the specific enrollment page to register with PAS. In response to the cardholders inquiry, in step 2, the enrollment server 708 presents the cardholder with authentication questions. In step 3, the cardholder answers the authentication questions and provides the required password.

The enrollment server then validates the answers through a validation process in step 4. The result of the validation process is returned to the enrollment server 708 in step 5. At step 6, databases and directory servers are updated. At step 7, the cardholder is informed whether or not his or her registration has been confirmed.

FIG. 8 illustrates the centralized payment flow that occurs between the cardholder client device 702, PAS 704, and the merchant system 720, according to one embodiment of the present invention. In FIG. 8, PAS 704 is shown to include a directory server 710, the ACS server 712, and a receipt database 714. The merchant server includes a storefront software program 722, a PAS provided merchant plug-in software module 724, and a payment system 726. The centralized payment flow begins when the cardholder shops at the merchant's electronic commerce web site at step 1. When the cardholder begins the checkout process, step 2 shows that the merchant plug-in module 724 checks to see if the cardholder has been enrolled in the directory server 710. If the cardholder is enrolled, the directory server returns the URL address of the issuer's ACS server to the merchant plug-in. At step 3, the merchant plug-in module 724 sends a PAReq message to the ACS 712. In response to the PAReq message, the cardholder eventually enters his or her password. Assuming the password is validated successfully by the ACS server, in step 4, a digitally signed PARes message is sent to the merchant plug-in module from the ACS 712 informing the merchant that the transaction is authenticated. The status of the transaction is sent to the payment system 726 in step 5. To conclude the transaction, in step 6, the merchant's storefront software 722 sends the payment data to the payment system.

FIG. 9 illustrates the enrollment flow in the distributed PAS architecture according to one embodiment of the present invention. As previously mentioned, the distributed architecture stores software and/or data on the cardholder's system. In the distributed approach, merchants determine a cardholder's participation in the PAS through a mechanism within the PAS cardholder module on the cardholder client device. The distributed architecture 900 includes at least the cardholder client device 902, which includes an Internet browser 904, and PAS 906, which includes an enrollment server 908. Note that in the distributed approach, there is no directory server. The enrollment process begins when a cardholder goes to the bank specific Internet enrollment page to register with PAS in step 1. In step 2, the cardholder is presented with authentication questions. In step 3, the cardholder returns answers to the authentication questions to the enrollment server 908. The cardholders answers are validated in step 4 through a validation process. The results of the validation process are returned to the enrollment server 908 in step 5. If the cardholder is validated, then a cardholder software module 910 and a certificate are provided to the cardholder in step 6. These are down-loaded across the internet from the enrollment server.

FIG. 10 illustrates the payment flow in the distributed PAS architecture according to one embodiment of the present invention. The merchant module 950 includes the storefront software 952, the merchant plug-in software module 954 and the payment system 956. The payment process begins, as usual, in step 1 when a cardholder shops and proceeds to checkout at a merchant's electronic commerce web site. In step 2 the merchant checks to see if the cardholder software module 910 is present in the cardholder's client device. If the cardholder software module 910 is present, the merchant module 954 sends a PAReq message to the cardholder software module 910, rather than an ACS as in the centralized architecture. The cardholder PAS software module, which knows the internet URL address of its issuer's ACS server, passes on the PAReq message to the ACS server. The ACS server dialogs with the cardholder module to ask the cardholder for his password. If the password supplied by the cardholder compares equal to the password for the same cardholder on the AHF, the cardholder is authenticated. Then the ACS server responds with the PARes message to the merchant module in step 4. The status of the authentication process and the associated data is sent to the payment system 956 in step 5. A receipt of the transactions is sent to the receipt database 960 in step 6. To conclude the transaction and the payment data are sent to the payment system from the storefront in step 7.

Chip Card Embodiment

A chip card embodiment of the Payer Authentication Service (PAS) involves a cardholder using an integrated circuit card (also known as a chip card or a smart card) and a chip card reader. The chip card embodiment adds another level of authentication in an online purchase transaction. Where the previously described PAS provides the ability to authenticate the identity of the cardholder in an online purchase, the chip card embodiment of PAS also provides the ability to authenticate that the cardholder actually has possession of his or her chip card. There are a variety of methods that can be used to validate the authenticity of the chip card. One approach is to use a secret generated by the chip, which can then be validated by the issuer's ACS.

The chip card embodiment can also use the PAS to authenticate the cardholder as described previously in this document in addition the authenticating the card. Two techniques may be used to provide the PAS password to the ACS. In a first technique, the chip card credit and debit application of the chip card prompts the cardholder to type in their PAS password. The cardholder enters in the password in a similar way as described previously. The password is then forwarded to the ACS.

In a second technique, the PAS password is automatically supplied to the ACS by the chip card. This technique uses passwords stored on the chip card to authenticate the cardholder in order to allow the cardholder to utilize the chip card. This approach uses an applet resident on the card referred to as the "Access" applet, because it provides universal access to the card and its resident applications, and can be used to authenticate a cardholder. The Access applet can also disable access to the applications on the card. Upon presentation of the single, universal "Access" password and authentication of the cardholder, the Access applet then allows the cardholder to access to a variety of services or applications (e.g., access to an online banking site, access to an electronic bill payment service). For example, by presentation of a single "Access" password, the applet then allows use of any stored passwords on the card.

Generally, the set up procedures and the authentication process for the chip card embodiment are the same as for the traditional card embodiment. The differences between the chip card embodiment and the traditional card embodiment will be evident in the description that follows.

Figure 10A:
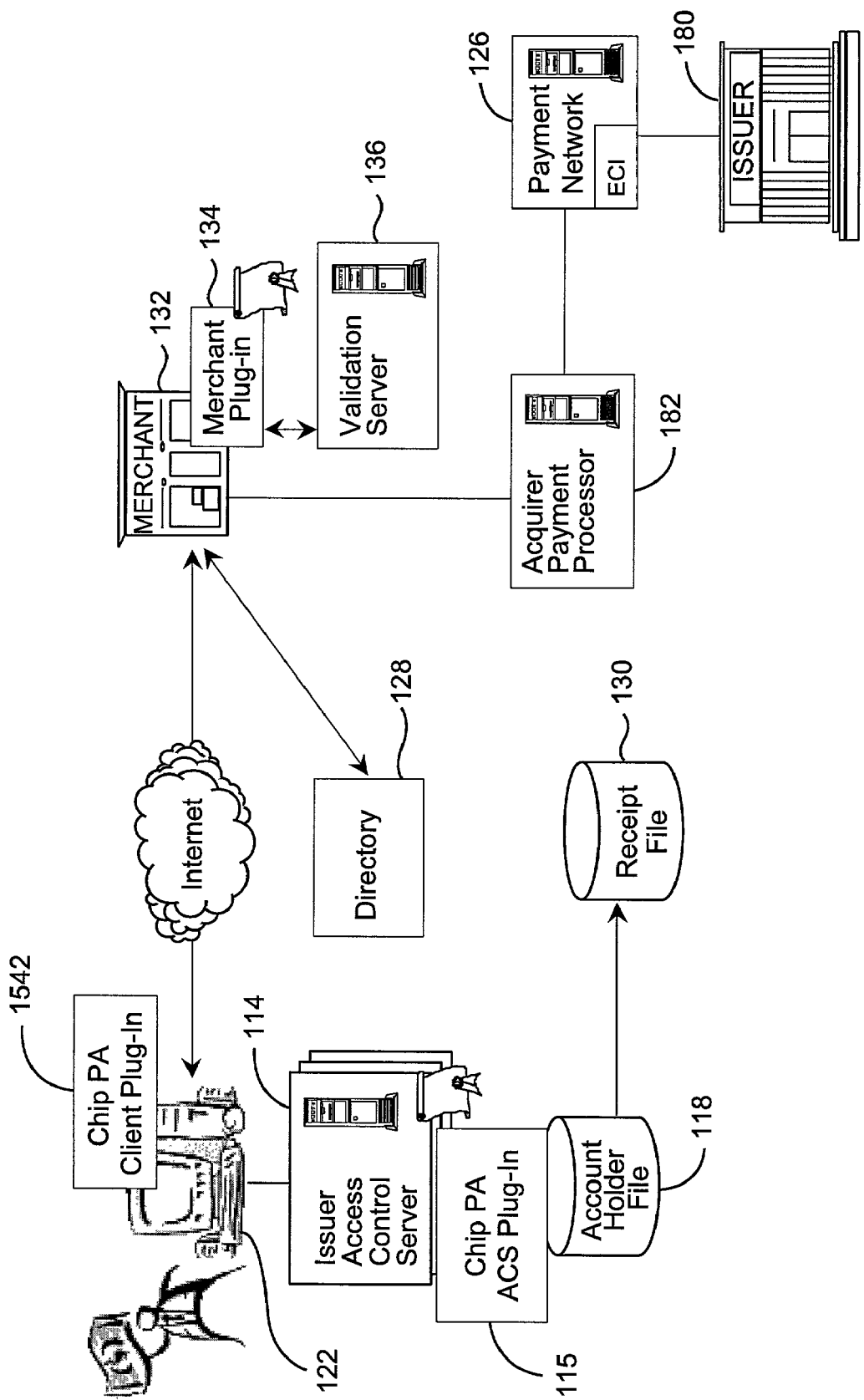
FIG. 10A provides a high-level system architecture view of one embodiment of the chip card payer authorization service.
Figure 11:
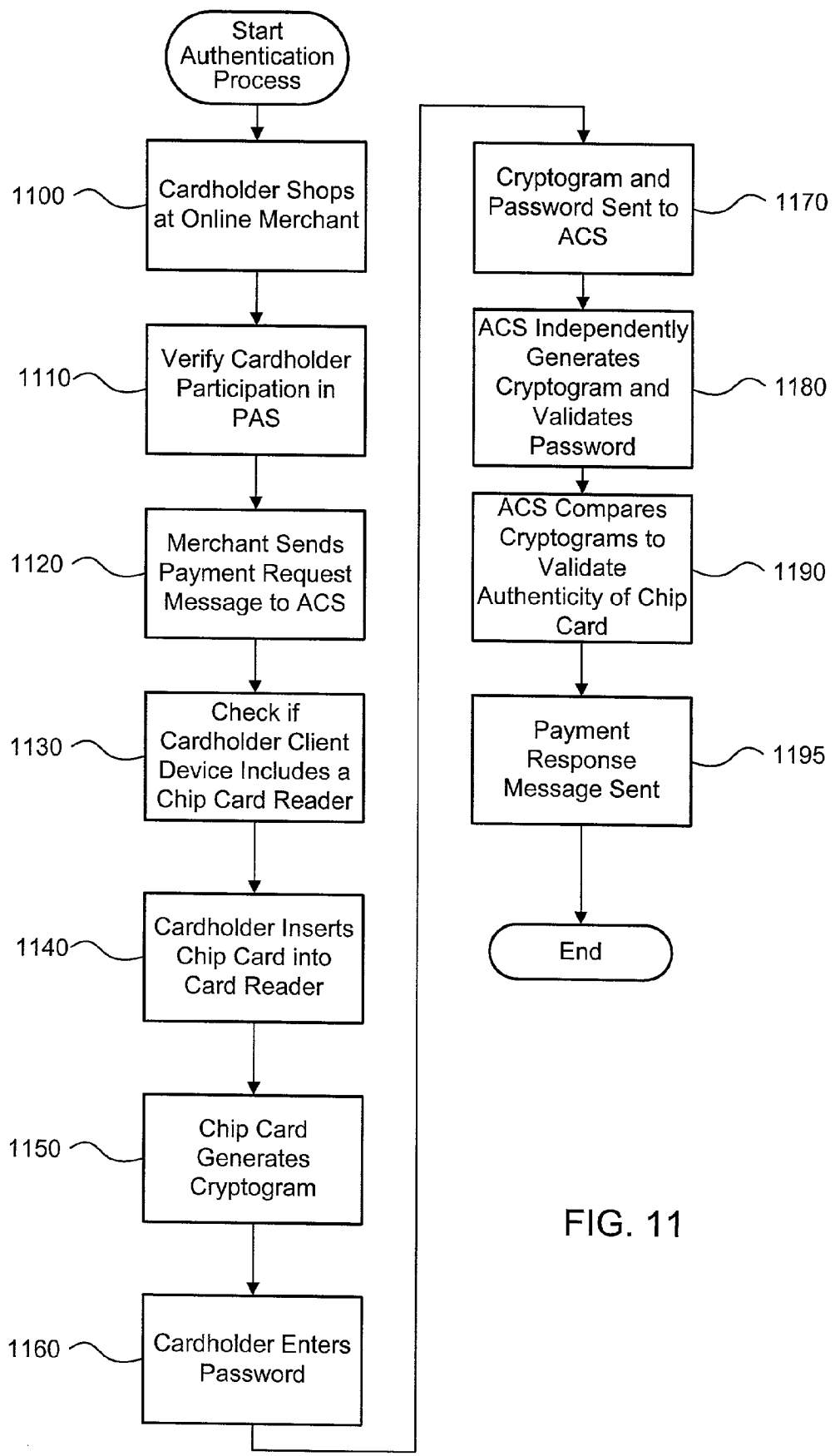
FIG. 11 is a flow chart describing one example of a payment transaction using the chip card embodiment of the payer authentication service.
Figure 12:
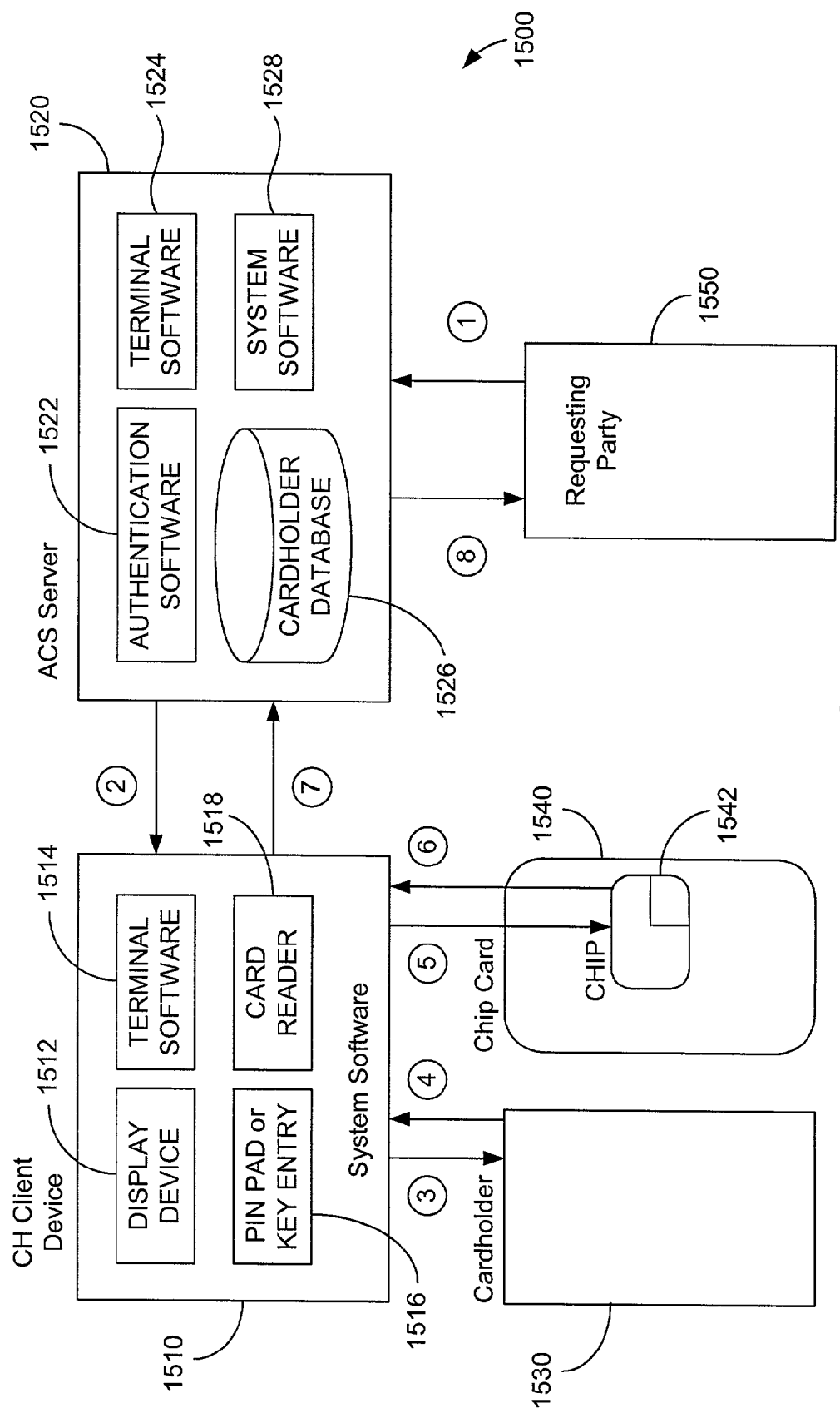
FIG. 12 illustrates a system architecture view of the chip card authentication process according to one embodiment of the present invention.
Figure 12A:
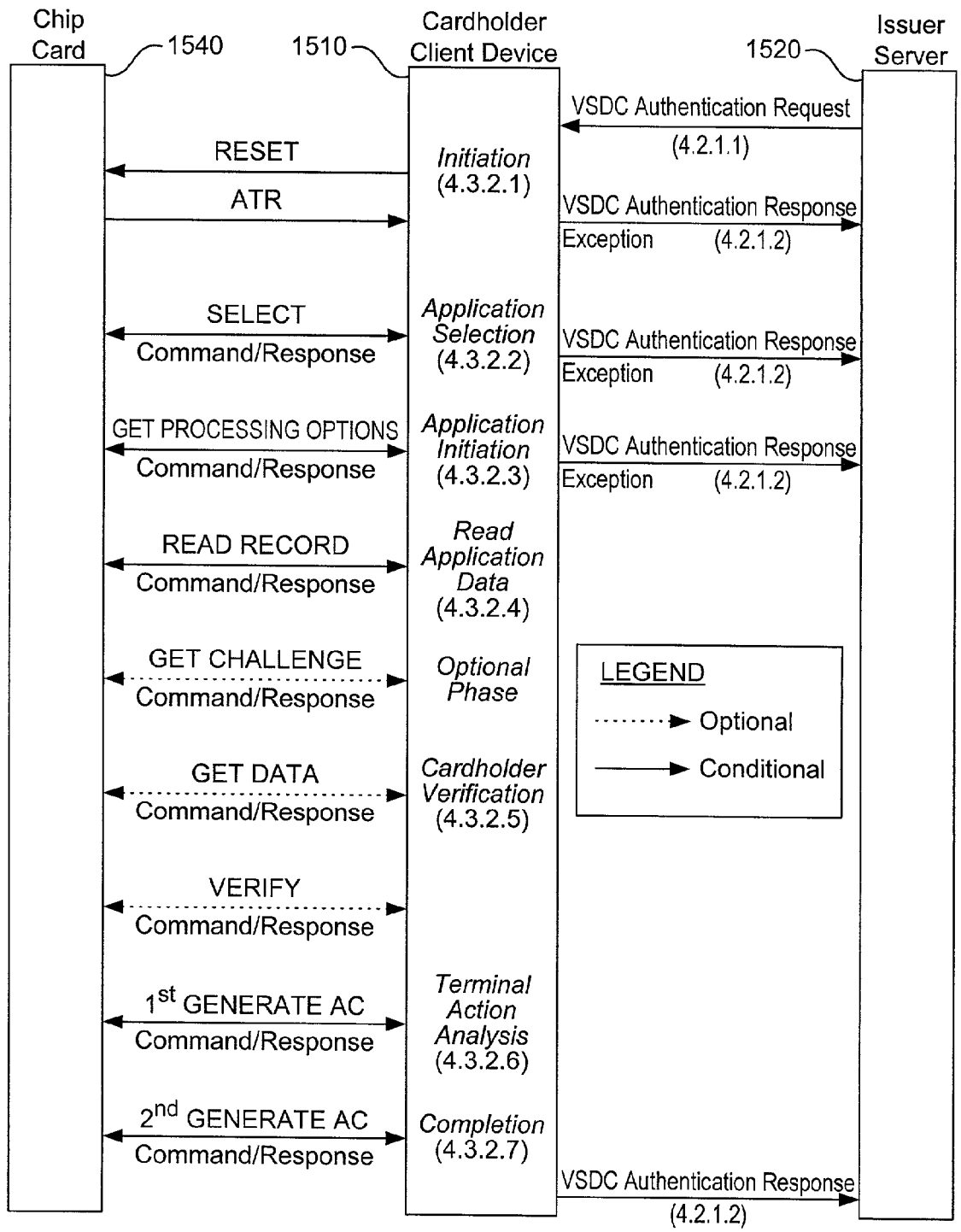
FIG. 12A illustrates a detailed flow of messages between the chip card, the cardholder client system, and the issuer's access control server.
Figure 13:
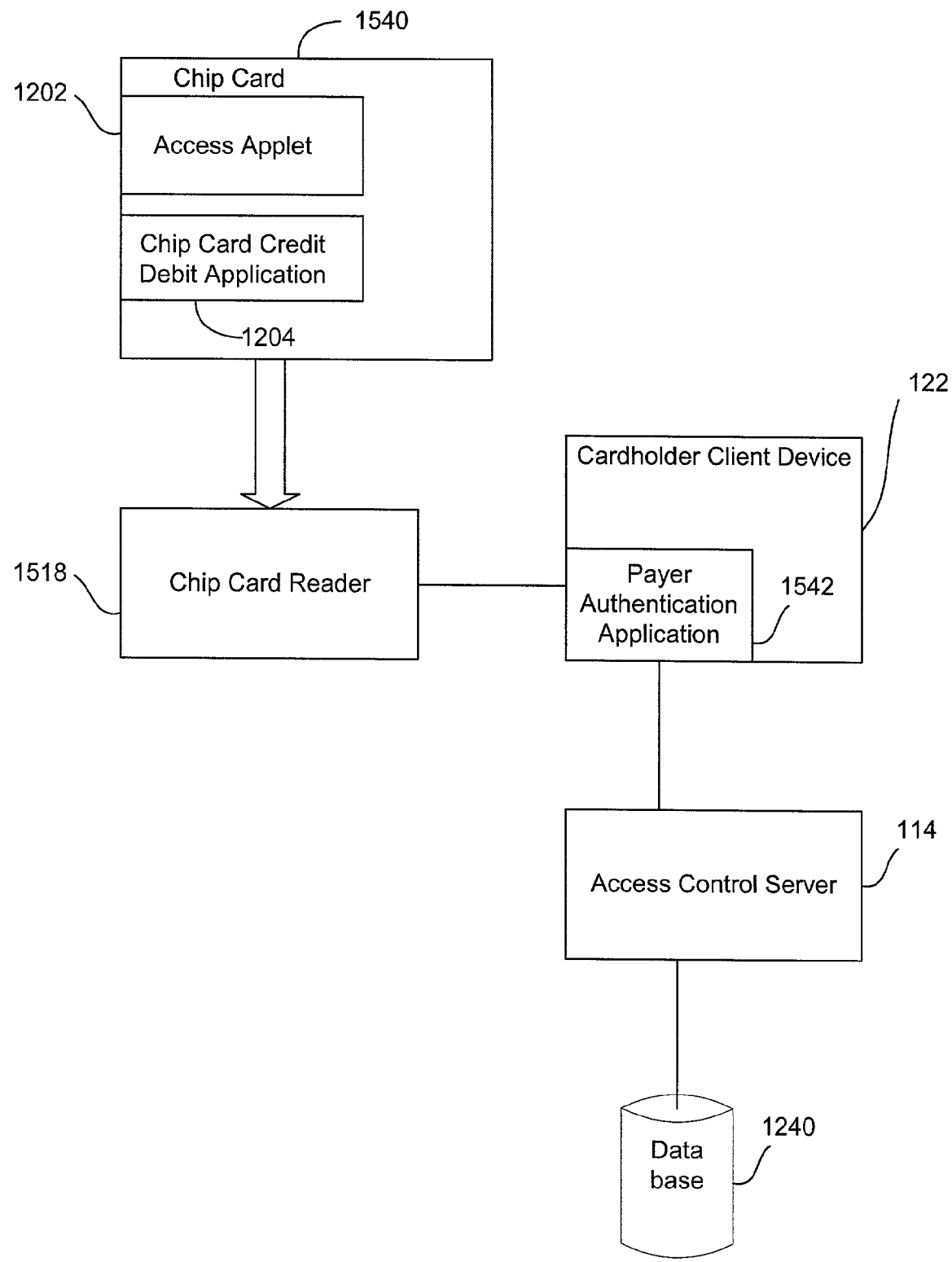
FIG. 13 illustrates a system diagram of the components utilized in the access control system embodiment of the payer authentication service.

The chip card embodiment of the PAS will be described relative to each of FIGS. 10A, 11, 12, 12A and 13. FIG. 10A illustrates one embodiment of the chip card payer authorization service architecture. FIG. 11 provides a general description of the PAS chip card and cardholder authentication in an authenticated payment transaction. FIG. 12 illustrates a combination of a system architecture layout along with superimposed process flows. FIG. 12A illustrates a more detailed flow of messages during a payment transaction using a payer authentication service with a chip card. Finally, FIG. 13 is used to illustrate a different embodiment of the chip card payer authentication system. Specifically, FIG. 13 illustrates the chip card embodiment with an added feature of the Access application that is used to control access to the various applications that may be on a chip card.

FIG. 10A provides a high-level system architecture view of one embodiment of the chip card payer authorization service. As usual, the payment transaction begins when the cardholder accesses a merchant's electronic commerce web site using a cardholder client device 122. The cardholder client device 122 contains a chip payer authentication client plug-in 1542 and is connected to the issuer access control server 114, which has a chip payer authentication ACS plug-in 115. The issuer ACS 114 is connected to an account holder file 118, which is in turn connected to a receipt file 130. The merchant 132 uses a merchant plug-in software module 134 to participate in the payer authentication service. The merchant 132 is connected to the directory server 128, the validation server 136, and the acquirer payment processor 182. The acquirer payment processor 182 is connected to the payment network 126, which is in turn connected to the issuer 180.

FIG. 11 illustrates a flow chart that provides a general description of a payment transaction using the chip card system. The payment transaction begins at block 1100 when a cardholder shops at an online merchant web site and desires to conclude the shopping experience at the checkout web page. In block 1110, the PAS verifies that the cardholder is a PAS registered participant, for example, after the cardholder clicks the "buy" button. Then in block 1120, the merchant plug-in module sends a PAReq message to the associated access control server, which leads to block 1130 where the access server via the PAS cardholder module in the cardholder client device verifies that the cardholder client device includes chip card reader. If the cardholder does not have a chip card reader, then the payment transaction is either ended or another payment method must be used.

If the cardholder client device has a chip card reader, then in block 1140 the consumer is directed to insert his or her chip card into the chip card reader. In block 1150, the cardholder module in the cardholder client device requests the chip card to generate a cryptogram based upon secret information contained in the chip card. Also, in block 1160, the cardholder is requested to enter his or her registered PAS password. In block 1170, the chip card generated cryptogram and the cardholder entered password are both sent to the ACS for authentication.

At block 1180, the ACS validates the PAS password in methods similar to those described for the non-chip card PAS system described previously as in FIG. 4. The ACS also independently generates another copy of the cryptogram for this chip card using information in the various components of the ACS server—see FIG. 12. If the PAS password matches, then the identity of the cardholder is authenticated. At block 1190, if the cryptograms generated by each the chip card and the ACS are matching, then it is verified that the actual chip card is being used by the cardholder. At block 1195, a payment response message is sent back by the ACS to the merchant plug-in software module. The payment response message contains a card authorization verification value (CAVV), to inform the merchant that the cardholder has been authenticated and that the actual card is being used at the cardholder client device is the proper card. The purchase transaction then proceeds as was described previously.

Now, FIG. 12 is presented to illustrate payment process flows that are superimposed upon a chip card system architecture according to one embodiment of the present invention. The chip card authentication architecture 1500 involves the cardholder client device 1510, the issuer's ACS 1520, the cardholder 1530, the chip card 1540, and the requesting party 1550. The requesting party in the PAS environment is typically the merchant. The cardholder client device 1510 includes a display device 1512, terminal software 1514, PIN pad or key entry device 1516, and the card reader 1518. The card reader 1518 is the electromechanical device into which a chip card is inserted for use with a terminal application, functionally equivalent to a Card Acceptance Device or InterFace Device (IFD in a physical point of sale environment).

The ACS 1520 includes PAS authentication software 1522, a hardware security module 1524, the cardholder database 1526, and system software 1528. The chip card 1540 includes a chip card credit and debit application 1542 such as the Visa Smart Debit Credit Application (VSDC). It should be appreciated that a general debit and credit application can be utilized in situations where the VSDC application is mentioned in the present specification.

The requesting party 1550 is the merchant associated with a particular payment transaction. The issuer server 1520 is the ACS operated by an issuer or a third party on behalf of an issuer capable of validating a chip card's cryptogram. It acts as the interface between the requesting party 1550 and the cardholder client device 1510. The cardholder client device 1510 is a system of components and software that acts as an interface among the cardholder 1530, the chip card 1540 and the issuer's ACS 1520 such as a personal computer, a mobile phone, a settop box or any other device or collection of functionally comparable components.

The cardholder 1530 is a party who is usually in control of the cardholder client device 1510 and capable of performing functions like inserting a card, entering a PIN or checking to see whether components of the cardholder client device 1510 are properly operational. Chip card 1540 is a payment card from an issuer that contains the chip card credit and debit application 1542, for example Visa Smart Debit Credit Application.

Referring to the numbered circles in FIG. 12, which correspond to ordered process steps, the following is a brief scenario describing what happens during chip card payment authentication processing. In step 1, a requesting party such as a merchant, determines that chip card authentication is required and calls upon the issuer ACS to do it.

In step 2, the issuer's ACS, having obtained the primary account number (PAN) for the card to be authenticated from the pay request message sends a message called the VSDC Authentication Request to the cardholder client device.

In step 3, the cardholder client device, acting in response to the request from the issuer's ACS attempts to authenticate the card. First it determines whether the necessary components are present and operational. Then, by putting a message on the display, the cardholder client device requests the cardholder to insert the chip card to be authenticated into the card reader.

In step 4, the cardholder responds by inserting the chip card in the card reader which generates a message to the cardholder client device informing it the card has been inserted, or depending upon how sophisticated the card reader is, the cardholder client device may need to poll the card reader using the path numbered 5 to determine whether it is now able to read the card.

In step 5, the cardholder client device initializes the chip card and the VSDC application on the chip card and then communicates with them to direct the return of a cryptogram from the chip card for later validation.

In step 6, in the course of communicating with the chip card several exchanges occur. The chip card may request that the cardholder to enter a PIN. If so then the cardholder client device notifies the cardholder to enter a PIN via a PIN pad or other key entry device.

In step 7, while sending messages (commands) and receiving responses from the card in steps 5 and 6, the cardholder client device was gathering the information necessary to compose the VSDC Authentication Response which it now sends to the issuer's ACS. The Access Control server using information provided in the VSDC Authentication Response message attempts to authenticate both the cardholder via his password and the chip card via its cryptogram.

In step 8, the issuer's ACS replies via a payment response message to the merchant or requesting party with the results of the cardholder and chip card authentication processes.

The principal functional capabilities of each entity in the VSDC Authentication service will now be described. The requesting party or merchant functions to signal or trigger the issuer's ACS to initiate chip card VSDC Authentication processing, provide issuer ACS with the necessary data to perform VSDC Authentication, and uses the result of VSDC Authentication provided by issuer's ACS.

The issuer's ACS functions to securely store cryptographic keys needed for cryptogram validation, collect the necessary data to perform VSDC Authentication processing, initiate VSDC Authentication processing by sending VSDC Authentication Request message to cardholder client device software, validate cryptogram sent from the chip card via the cardholder client device in its attached Hardware Security Module (HSM), and provide the result of the validation of cryptogram to requesting party or merchant via the payment response message.

The cardholder client device functions to communicate with issuer ACS, receive VSDC Authentication Request message, communicate with cardholder for card insertion/removal and PIN entry, communicate with the chip card, send necessary data for VSDC Authentication to chip card, receive necessary data for VSDC Authentication from chip card, receive cryptogram from chip card, and send the card generated cryptogram to the issuer ACS. The cardholder client device also requests the cardholder to enter his password and passes the entered password to the ACS.

The cardholder functions to insert chip card into card reader, determine whether the chip card environment is ready, enter PIN, remove chip card from card reader, and enter his or her password.

Detailed Message Flow Example

FIG. 12A illustrates a detailed flow of messages between the chip card 1540, the cardholder client system 1510, and the issuer's access control server 1520. This flow of messages defines the manner in which chip card payment authentication processing is performed. The flow of messages is organized in a top-down manner that progresses through the phases of the authentication process.

Explanation of Message Flow

This section briefly describes the phases of the VSDC Authentication processing in the order in which they occur as illustrated in FIG. 12A:

4.2.1.1 VSDC Authentication Request—The issuer's ACS starts the VSDC Authentication processing.

4.3.2.1 Initiation—The cardholder client device software prompts the cardholder to insert the chip card into the card reader.

4.3.2.2 Application Selection—The cardholder client device software selects a VSDC application from the chip card.

4.3.2.3 Application Initiation—The cardholder client system device and the chip card initiate VSDC Authentication processing.

4.3.2.4 Read Application Data—The cardholder client system device reads the application data from the chip card.

4.3.2.5 Cardholder Verification (Optional)—The cardholder client device software performs offline PIN verification to authenticate cardholder.

4.3.2.6 Terminal Action Analysis—The cardholder client system device requests the chip card to generate the cryptogram.

4.3.2.7 Completion—The cardholder client device software completes and terminates the processing for VSDC Authentication.

4.2.1.2 VSDC Authentication Response—The cardholder client device software returns the cryptogram and the other data to the issuer's ACS server.

Now the message flow and the functions involved in generating the flow between the cardholder client device software and the chip card will be described. VSDC Authentication Request is the message that delivers the necessary data from the issuer access control server to the cardholder client device software to invoke the cardholder client device software to start processing. VSDC Authentication response is the message that returns the cryptogram and the supporting data from the cardholder client device software to the issuer's ACS.

Now, the details of message and processing flow will be described:

VSDC Authentication Request is the message that invokes the cardholder client device software to start VSDC Authentication processing. This message contains the necessary data for the chip card to generate a cryptogram.

The issuer's ACS preferably should obtain or generate the necessary data listed here: Amount, Authorized; Application Identifier; Application Label (of VSDC application); Application Preferred Name; Terminal Country Code; Transaction Currency Code; Transaction Date; Transaction Type; and Unpredictable Number.

The source of these data varies dependent on the authentication environment within which VSDC Authentication is working. The issuer's ACS preferably should construct a VSDC Authentication Request to deliver these data to the cardholder client device software. This message preferably should invoke the cardholder client device software to start the processing between the cardholder client device software and the chip card.

The cardholder client device software preferably should start the initiation process.

4.2.1.2. VSDC Authentication Response

VSDC Authentication Response is the message that delivers the cryptogram and the other supporting data to the issuer' ACS server. VSDC Authentication Response message is also used to deliver the status code when errors and exceptions occur during VSDC Authentication processing. The VSDC Authentication Response message is also used to provide the access control server with the cardholder's password.

The cardholder client device software preferably should obtain all the necessary data described in the table 1 below.

TABLE 1

| Data Element | Source |
| --- | --- |
| Cryptogram | From the first GENERATE AC response message. |
| Derivation Key Index (DKI) | From the first GENERATE AC response message. (DKI is a component of issuer Application Data.) |
| Cryptogram Version Number | From the first GENERATE AC response message. (Cryptogram Version Number is a component of issuer Application Data.) |
| Application Interchange Profile (AIP) | From the GET PROCESSING OPTIONS response message. |
| Application Transaction Counter (ATC) | From the first GENERATE AC response message. |
| Card Verification Results (CVR) | From the first GENERATE AC response message. (CVR is a component of issuer Application Data.) |
| Terminal Verification Results (TVR) | From the cardholder client device software. |
| PAN Sequence Number | From the READ RECORD response message. |
| Status Code | From the cardholder client device software. |
| Reserved for future use 1 | Filled by "00000000000000000000" |
| Reserved for future use 2 | Undefined format and content, 10 bytes. |

The cardholder client device software preferably should construct a VSDC Authentication Response message to deliver these data to the issuer's ACS server.

The issuer's ACS server preferably should retrieve the data from the VSDC Authentication Response and validate both the cryptogram and the cardholder's password. The issuer's ACS server receives the VSDC Authentication Response containing status codes when errors or exceptions occur and when processing completes successfully between the cardholder client device software and the chip card. The issuer's ACS server may store the data from the cardholder client device software to permit the issuer to use that information to analyze the processing that occurred between the chip card and the cardholder client device software and to respond to inquiries from cardholders when errors and exception occurs.

Optional process at issuer ACS—If the authentication environment requests, the issuer ACS may need to send the result of the authentication to the merchant or requesting party. In some environments, the issuer ACS may send an indication that a cryptogram authentication has occurred and whether it was successful. Note: The VSDC Authentication Response is always sent even if the cardholder client device software terminates prematurely due to errors or other causes.

The description will now cover the message flow and the functions involved in generating the flow between the VSDC application on the chip card and the cardholder client device software. First, an overview of processing flow of cardholder client device software functions to the chip card message flow is provided. The functions are those of initiation, application selection, application initiation, read application data, cardholder verification, termianl action analysis, and completion.

Initiation describes how the cardholder client device software assures that the chip card is inserted into the card reader and is ready for the process. Application Selection describes how the cardholder client device software proceeds to select VSDC application on the chip card for VSDC Authentication processing. Application Initiation describes how the cardholder client device software initiates the VSDC application on the chip card. Read Application Data describes how the cardholder client device software reads the VSDC application data from the chip card. Cardholder Verification describes how the cardholder client device software performs cardholder verification. Terminal Action Analysis describes how the cardholder client device software requests the chip card to generate the Cryptogram. Completion describes how the cardholder client device software terminates the chip card processing and ends its processing.

A detailed explanation of each flow and message will now be given.

4.3.2.1. INITIATION—The Initiation phase comprises two sub-phases. One is Initiation for the card environment on the cardholder client device and the other is Initiation for the chip card.

The cardholder client device software preferably should assure to the extent possible in the environment that the card reader and any associated device support software necessary to enable it are ready for card insertion. If the card environment is not ready, the cardholder client device software preferably should communicate with Cardholder to verify that conditions at the cardholder client device are correctly set up. Communication with the cardholder might include asking such questions as whether the card reader is properly attached, whether the power is on, and whether the correct version of card reader driver software is installed. The cardholder client device software may terminate the VSDC Authentication processing if it determines that the card environment cannot be made ready. When the cardholder client device software terminates processing it preferably should skip all succeeding phases and return the VSDC Authentication Response message to the issuer Service with an appropriate status code.

If the sub-phase "4.3.2.1.2 Initiation for the chip card" fails, control may return to this sub-phase whereupon the cardholder client device software prompts the cardholder to insert the chip card. The cardholder client device software may terminate VSDC Authentication processing if, after it requests card insertion and returns again to "Initiation for the chip card", the chip card subsequently fails to respond. When the cardholder client device software terminates VSDC Authentication processing, it preferably should skip all the succeeding phases and preferably should send the VSDC Authentication Response message to the issuer ACS with an appropriate status code.

Initiation for the chip card—In this sub-processing phase the cardholder client device software communicates with the chip card to determine whether it is ready for processing.

The cardholder client device software preferably should reset the chip card. The chip card returns an Answer To Reset (ATR) to the cardholder client device software, or the chip card fails to return an ATR.

When the cardholder client device software receives ATR, it proceeds to the next phase, Application Selection. When the chip card does not return ATR within a time established by standards, the cardholder client device software may return to "4.3.2.1.1 Initiation for card environment on cardholder client device" or it may terminate VSDC Authentication processing. When the cardholder client device software terminates VSDC Authentication processing, it preferably should skip all the succeeding phases and preferably should send the VSDC Authentication Response message to the issuer server with an appropriate status code.

4.3.2.2. Application Selection

Application Selection is the processing phase in which the cardholder client device software selects the VSDC application from the chip card.

Process at the cardholder client device software includes the following:

(a) The cardholder client device software preferably should perform Application Selection.

(b) To comply with security requirements, cardholder client device software preferably should use only the Explicit Selection Method, sending the SELECT commands with the AID (Application ID) as supplied in the VSDC Authentication Request.

(c) If the response to the first SELECT command returns an AID with no suffix, then there is only one instance of the application for the requested AID on the card. Processing continues with step g) below.

(d) If the response to the first SELECT command returned an AID with a suffix indicating there are multiple instances of the application for the requested AID on the card then processing continues with step e) through step g) below, (e) By issuing successive SELECT commands using the AID (as supplied in the VSDC Authentication Request) until the card indicates there are no additional instances of applications for the requested AID to be returned. As each AID is returned the cardholder client device software constructs a list of AIDs along with the corresponding Application Label and Application Preferred Name for each AID.

(f) Using the Application Label and the Application Preferred Name as supplied in the VSDC Authentication Request the cardholder client device software searches the list constructed in the prior step for a match. The SELECT command is issued to the card using the AID of the matched list entry. If no match is found, the appropriate status code is set for return in the VSDC Authentication Response as indicated in "Exception handling" below.

(g) Application Selection for the cardholder client device software is complete. Either there was a singular eligible application on the card and it was selected in step c) above. Or, it has been determined among multiple eligible applications which one to select in step f) above.

(h) When the cardholder client device software and the chip card support multiple applications in addition to VSDC, it is the issuer's responsibility to decide which and in what sequence other applications are to be executed.

The chip card performs Application Selection.

Exception handling—If the VSDC application is not found, the cardholder client device software preferably should terminate VSDC Authentication processing. When the cardholder client device software terminates VSDC Authentication processing, it preferably should skip all the succeeding phases and preferably should send VSDC Authentication Response to the issuer server with an appropriate status code.

4.3.2.3. Application Initiation

Application Initiation is the processing phase during which the cardholder client device software signals to the chip card that transaction processing is beginning.

The cardholder client device software preferably should initiate the application. The cardholder client device software preferably should send the GET PROCESSING OPTIONS command to chip card to initiate the VSDC application.

The chip card responds to the GET PROCESSING OPTIONS command.

The cardholder client device software preferably should store the Application Interchange Profile that will be used in later phases to construct the VSDC Authentication Response. Enforcing geographical restrictions is one of the optional functions of the VSDC application.

When the chip card responds to the GET PROCESSING OPTIONS command with an error code that indicates the conditions of use are not satisfied, the VSDC Authentication processing must be terminated.

If the card terminates the transaction then the cardholder client software device preferably should skip all the succeeding phases and preferably should send the VSDC Authentication Response message to the issuer server with an appropriate status code. Note: It is the issuer's responsibility to decide what action to take after termination of VSDC Authentication processing. Such decisions and consequent actions are outside the scope of this document.

4.3.2.4. READ APPLICATION DATA—Read Application Data is the processing phase in which the cardholder client device software reads the records of VSDC application files on the chip card.

The cardholder client device software preferably should read the VSDC application data. The cardholder client device software preferably should sends READ RECORD commands to retrieve the necessary data from the VSDC application. The cardholder client device software preferably should retain the value of the PAN Sequence Number for later use in composing the VSDC Authentication Response.

The VSDC application responds to the READ RECORD commands.

4.3.2.5. CARDHOLDER VERIFICATION—Cardholder Verification is the phase of processing in which the cardholder client device software may verify the cardholder by using an offline PIN verification method. Note: Cardholder Verification must be implemented in compliance with appropriate Visa security guidelines.

Conditions of execution—This phase is conditional, i.e. required only when cardholder Verification is implemented and available on the card and in the cardholder client device software.

The cardholder client device software preferably should verify the cardholder using the Offline Plaintext PIN Verification method. Neither the Offline Enciphered PIN Verification method or Online PIN verification is supported.

The chip card performs Offline Plaintext PIN Verification. In response to the first GENERATE AC command, the chip card provides the result of the offline PIN verification in the CVR.

4.3.2.6. TERMINAL ACTION ANALYSIS—Terminal Action Analysis is the phase of processing in which the cardholder client device software requests the chip card to generate a Cryptogram, which will be sent to the issuer server for validation.

The cardholder client device software preferably should perform Terminal Action Analysis. The cardholder client device software preferably should assume the role of the "merchant POS terminal" described therein and behave just like that terminal with the following exceptions:

a) Issuer Action Code and Terminal Action Code Processing: The cardholder client device software preferably should not compare the Terminal Verification Results to the chip card's issuer Action Codes or to Terminal Action Codes.

b) GENERATE AC Command: The cardholder client device software preferably should construct the GENERATE AC command by requesting only ARQC, i.e., must not request AAC or TC during Terminal Action Analysis.

Terminal Verification Results (TVR) values—Terminal Verification Results is a record of the outcome of the various application functions performed by the cardholder client device. Different from the standard VSDC processing at POS terminal, some of the values are static for VSDC authentication. The values to be assigned to bits that are static are indicated below. Bits whose values are to be dynamically set, will be set by the cardholder client device during the course of the VSDC Authentication processing.

The chip card produces a cryptogram.

4.3.2.7. COMPLETION—Completion is the processing phase in which the cardholder client device software terminates the processing of the chip card.

Process variation—The cardholder client device software processing preferably should vary based upon the GENERATE AC response message. The cardholder client device software preferably should perform Completion. The VSDC application provides the chip card with the authority to decline transactions offline (AAC) even if the cardholder client device software issues the first GENERATE AC command for an online authorization (ARQC). Therefore the client cardholder device software should expect that the chip card will return either an ARQC or AAC during VSDC Authentication processing. To determine whether the outcome of the GENERATE AC is an ARQC or AAC the issuer ACS can check the CVR.

VSDC Authentication preferably should continue processing even though the response from the chip card is Offline Decline (AAC). Processing can continue because even though the response indicates declined, the returned cryptogram can nonetheless be used for card authentication. VSDC Authentication requires the cryptogram for card authentication regardless of the type of the cryptogram.

4.3.2.7.1. Card Response is ARQC

This sub-section describes the processing flow when the chip card returns an Authorization ReQuest Cryptogram (ARQC). For VSDC Authentication, such an interpretation is not relevant because an authorization will not be requested and VSDC Authentication is always an "online" process. The objective of issuing the GENERATE AC command is to cause the card to return a cryptogram for validation.

After receiving the first GENERATE AC response with ARQC from the chip card, the cardholder client device software preferably should perform the following:

The cardholder client device software preferably should keep only the cryptogram and no other data except for the following data elements sent from the chip card in order to send them to the issuer server; see Table 2.

TABLE 2

| Data | Element Source |
|---|---|
| Cryptogram | From the first GENERATE AC response message. |
| Derivation Key Index (DKI) | From the first GENERATE AC response message. (DKI is a component of issuer Application Data.) |
| Cryptogram Version Number | From the first GENERATE AC response message. Cryptogram Version Number is a component of issuer Application Data. |
| Application Transaction Counter (ATC) | From the first GENERATE AC response message. |
| Card Verification Results (CVR) | From the first GENERATE AC response message. (CVR is a component of issuer Application Data.) |

The cardholder client device software preferably should store information necessary for subsequent phases to prepare and send the VSDC Authentication Response. Then, the cardholder client device software preferably should issue the final GENERATE AC command to the chip card as if the online authorization response would indicate transaction unapproved by the issuer. It means that the cardholder client device software requests an AAC. Note: There are no authorization request/response messages in VSDC Authentication processing.

Source of data listed in CDOL2—The Data Elements, which the cardholder client device software transmits to the chip card in the data field of the final GENERATE AC command, preferably should be obtained from the sources indicated in the table 3 below.

TABLE 3

| Data Element | Source |
|---|---|
| Amount, Authorized | From Network-based VSDC Authentication Request message |

TABLE 3-continued

| Data Element | Source |
| --- | --- |
| Amount, Other | From Network-based VSDC Authentication Request message |
| Terminal Country Code | From Network-based VSDC Authentication Request message |
| Terminal Verification Results (TVR) | From the cardholder client device software |
| Transaction Currency Code | From Network-based VSDC Authentication Request message |
| Transaction Date | From Network-based VSDC Authentication Request message |
| Transaction Type | From Network-based VSDC Authentication Request message |
| Unpredictable Number | From Network-based VSDC Authentication Request message |

The chip card returns the response to the final GENERATE AC command with AAC.

The cardholder client device software preferably should ignore a response from the chip card to the final GENERATE AC command. The cardholder client device software preferably should comply with security requirements by clearing from its memory extraneous data received from the chip card. Note: It is assumed that by this time all prior unused data from previous phases have been cleared in compliance with security requirements.

Card Response is AAC

This sub-section describes the processing flow when the chip card returns an Application Authentication Cryptogram (AAC). For VSDC Authentication, such an interpretation is not relevant because an authorization was not requested. The objective of issuing the GENERATE AC command is to cause the card to return a cryptogram for authentication of the chip card.

After receiving the AAC in the response to the first GENERATE AC command from the chip card, the cardholder client device software preferably should perform the following functions. The cardholder client device software preferably should keep the cryptogram and the other information sent from the chip card in order to send them to the issuer ACS. The cardholder client device software preferably should prepare to send VSDC Authentication Response. The cardholder client device software preferably should clear all the data received from the chip card in all phases.

Chip Card Embodiment with Access Application

Now that the description of the message flows in FIG. 12A has been completed, embodiment of the chip card device utilizing an Access application will now be presented.

The additional embodiment of the chip card system involves an Access application that can optionally be used as an extra feature of the chip card system. The Access application is used to control access to the chip card and the multiple applications that may reside on the chip card. The Access application can be referred to as the "Access application or applet." The Access application controls access to the other applications resident upon the chip card. In this manner, the Access application is able to verify the identity of the person attempting to utilize the chip card and its associated applications. If the person attempting to use the chip card enters the correct user identification number or string, and a password, then it is presumed that an authorized person is about to use the chip card. In this case, the Access application unlocks all of the applications on the chip card so that they may be used. In addition to unlocking the applications, the Access application can make the passwords for the applications on the chip card available for use. In some embodiments of the Access application, only a select number of the applications will be unlocked after entering the correct information in response to the Access application.

There are numerous references to the passwords or secret values that the cardholder enters and/or the issuer ACS checks. As shown in Table 4, secrets #1, #2, and #3 are different values (and none of the three is a financial ATM or POS PIN).

TABLE 4

Passwords and Secret Values

Secret #1 A cardholder-defined password to enable access to the chip card Access application for chip-based payer authentication. In some embodiments, secret #1 allows an access program on a smart card to open all the applications on a smart card, including the PAS application.
Secret #2 An issuer-defined password returned by the chip card Access application to enable the ACS to validate the cardholder for chip-based payer authentication. The cardholder is not required to know this password since it is automatically used to open applications on the smart card.
Secret #3: The password used in the non-chip card embodiment of PAS (the core system). The cardholder-defined password to enable the ACS to validate the cardholder. This password or secret can also be used to validate the cardholder when chip card access is not available on the card.

FIG. 13 illustrates a system diagram of the components utilized in the payer authentication service using the chip card and a universal Access application. The system diagram of FIG. 13 shows the chip card 1540, the chip card reader 1518, the cardholder client device 122, the access control server 114, and a database 1240. The chip card 1540 includes the access applet 1202 and the chip card credit and debit application 1204. The access applet 1202 stores a password, which is secret #2, that will be used to unlock the various applications on the chip card. The cardholder client device includes the payer authentication application 1542.

Upon making an online purchase transaction, the access applet 1202 prompts the cardholder to enter his or her user ID and password, which is secret #1. If the cardholder enters the correct user ID and the associated password, then secret #2 is automatically used to unlock the applications on the chip card. Then the PAS system utilizing the chip card system can proceed as was described earlier in this specification.

This second, more detailed description explains the processes and commands that should be supported by the cardholder client device software, which facilitates communication between the chip card reader, the cardholder's Internet browser and the ACS.

The various basic processes and commands will now be described. First, the cardholder client device software will be activated by a message from the ACS server (client can also be implemented with a timeout feature, e.g. a client will be timed out after 30 minutes). Then, the cardholder client device software will check for the existence of a compliant chip reader and respond to the ACS that it is capable of processing a chip based payer authentication transaction. The cardholder client device software will receive a message from the ACS containing the appropriate merchant and ACS data to enable a chip card program (e.g., VSDC application) to generate a cryptogram. An example of such a chip card program is the Visa Smart Debit Credit application (VSDC), which is Visa's implementation of the Europay, Mastercard, and Visa (EMV)

chip card standard. The cryptogram is a cryptographic value generated by the card that is specific to the card and to each transaction. The ACS can validate that the cryptogram using cryptographic keys in hardware security module. It is noted that the VSDC application is the same application used in the face-to-face transaction taking place at brick-and-mortar POS merchant.

After receiving the message from the ACS, the cardholder client device software will check for the presence of secret #2 and UID in the defined data element. If it is not available, the cardholder client device software will ask the cardholder to insert the chip card and enter secret #1 to validate against the chip card Access application and retrieve secret #2 and User ID (UID).

If the cardholder is validated for chip-based payer authentication, the cardholder client device software will execute a VSDC purchase transaction to obtain the cryptogram and associated data to perform Online chip card Authentication.

Execution of the VSDC purchase transaction involves multiple steps to be taken by each of the cardholder client device software and the VSDC chip application. The cardholder client device software will perform Application Selection using the Explicit Selection Method by issuing one or more SELECT commands to the card. The cardholder client device software will also issue a GET PROCESSING OPTIONS command that includes the PDOL, if a PDOL was present in the File Control Information (FCI) from Application Selection. Then the VSDC chip application will return the Application File Locator (AFL) and Application Interchange Profile (AIP) in the response from the GET PROCESSING OPTIONS command.

The cardholder client device software will issue the READ RECORD commands necessary to read the VSDC chip application records designated by the AFL. Note: The chip will return all of the data necessary to complete a VSDC purchase transaction, as well as the data used for internet payment authentication. The cardholder client device software will need to parse out the correct data. The cardholder client device software will then perform the Processing Restrictions checks, bypass CVM List Processing, and bypass Terminal Risk Management except for the Floor Limit and New card checks. All transactions will be over the floor limit. The cardholder client device software will set the TVR Transaction Exceeds Floor Limit bit to '1'. The cardholder client device software will perform Terminal Action Analysis and always request an ARQC (online) cryptogram in the GENERATE AC command. This command will include the CDOL1 data including Transaction Date and the Unpredictable Number from the ACS. Then the cardholder client device software will pass the cryptogram returned by the chip and supporting data unaltered to the ACS for validation. Finally, the cardholder client device software will issue a GENERATE AC command requesting an AAC. This will terminate the transaction on the VSDC card application. After issuing the second GENERATE AC command, all information from the transaction should be forgotten by the cardholder client device software The following process occurs after the Merchant Plug In forwards the PAReq message to the ACS. First, the ACS should determine if the cardholder's PC is chip-enabled. (Note: Though the PAN may be registered as being chip-enabled, this step is necessary in those situations where the PC currently being used in the transaction does not have a chip reader or is otherwise not chip-enabled.) The ACS should allow the issuer to configure two different actions for the situation when the PC is not chip enabled or the chip is not readable.

Option #1, prompt the cardholder for secret #3 (his or her PAS password). Option #2, do not perform any cardholder nor chip card authentication and populate the PARes Transaction Status field with a "not applicable" response. The ACS should extract all of the appropriate merchant information from the PAReq and provide this data and the appropriate ACS information to the cardholder client device software that will be required to request the chip card to generate a cryptogram.

The ACS then sends the information to support the cryptogram to the cardholder's cardholder client device software and sends a request for secret #2 and the Unique Identifier (UID). The cardholder client device software invokes an application that obtains secret #2 (password) and UID from the previously performed chip-enabled check-out process. If secret #2 is not available via this procedure, the cardholder client device software obtains secret #2 from the chip card by invoking the Access applet, which requires the cardholder to enter secret #1 to activate the applet, and obtains secret #2 and UID from within the Access applet on the chip card. If the Access applet is not present on the chip card, The cardholder client device software asks the cardholder to enter secret #3 (his or her PAS password).

After secret #2 and UID are obtained, the cardholder client device software initiates a VSDC transaction to generate a cryptogram request and obtain the cryptogram from the chip card. If secret #2 is not obtained (i.e. the cardholder is not validated), the cardholder client device software does not call upon the VSDC applet.

The cardholder client device software returns secret #2, the cryptogram, and the supporting data to the ACS for the ACS to validate the cryptogram to the ACS. The ACS accepts the cardholder client device software's input and validates it against the Account Holder Database. If there is more than one Account Holder Database entry (secret #2) for a Primary Account Number (PAN), the cardholder is validated if any of the entries (secret #2) match the secret #2 sent to the ACS by the cardholder client device software.

The ACS validates the card by replicating the cryptogram and comparing it to the cryptogram from the chip card sent to the ACS by the cardholder client device software. The ACS creates the PARes message, populating all of the, and returns the PARes message to the merchant via the connection through the cardholder's browser.

The ACS digitally signs the PARes, sets the PARes Transaction Status, Transaction Detail, ECI, values, chip card codes indicating the type of card, payment conditions, and card authentication results, and sends the signed PARes back to the merchant, and generates a SaveReceipt message to the receipt manager 131 (the SaveReceipt message may also be referred to as the PATrans message).

Two types of chip cards carry the Visa Smart Debit/Credit (VSDC) application. First is a card that is capable of validating the cardholder (payer) offline via the Access application on the card using the access password or secret #1. The access password is obtained from the cardholder and passed to the cardholder client device software on the browser. If the access password provided is correct, the chip card Access application returns secret #2 and UID to the cardholder client device software. Secondly, a card that is not capable of validating the cardholder (payer) offline (i.e., a card that only contains the VSDC application). In this case the cardholder client device software on the browser prompts the cardholder for secret #3 (his or her password) and it is provided to the ACS to achieve cardholder authentication.

The flow related to the cardholder client device software after it is given control from the ACS (after the ACS has received the PAReq message from the merchant plug-in) will now be presented. The cardholder client device software should first determine if the cardholder's PC is chip card enabled (chip card reader and client software components present). If it is not, the transaction is processed via core payer authentication. If the PC is chip card enabled, then in step 2, obtain the secret #2 via the Access application on the chip card or obtain the secret #3 via a prompt to the cardholder.

If secret #2 and UID or secret #3 is provided, Call the VSDC application on the chip to: retrieve the Magnetic Stripe Image (MSI) data element, retrieve the chip data necessary to allow the ACS to regenerate the cryptogram, and generate the ARQC cryptogram. If secret #2 or #3 is not provided, the VSDC applet is not called.

Send the following data to the ACS for card authentication: the ARQC cryptogram, magnetic stripe image (MSI), and the data to support the cryptogram regeneration by the ACS. Optionally, the MSI data can be read.

Then send secret #2 and UID) or secret #3 to the ACS for cardholder authentication.

Generally, it is noted that chip cardholders will be allowed to conduct purchase transactions on the Internet without the card being present via core payer authentication (PAS without the chip card and chip card reader components). Also, the cardholder client device software distributed by the issuer should support all types of VSDC cards. Authentication should accommodate chip-based payment applications that implement the full and limited versions of Visa Smart Debit or Credit applets. Initially the chip-based payment application deployed will support limited VSDC features on an Open Platform card. This limited VSDC payment applet, "jump start", supports the following subset of the "full" VSDC features: MSI, Online Card Authentication, and offline Static Data Authentication (SDA). However, SDA is not performed during Internet transactions. All information from the transaction should be forgotten by the payer authentication cardholder client device software at the end of the transaction. (Such as at the time the PARes message is sent to the merchant).

The ACS is configurable by the issuer to allow different actions to be taken when the cardholder client device software is not available or is not able to read the chip card. Option #1, the ACS will prompt the cardholder to manually enter secret #3 or option #2, no authentication is conducted and a "not applicable" response is returned to the merchant.

Chip cardholders will be allowed to conduct purchase transactions on the Internet without the card being present (for example, from a different PC without the cardholder client device software and chip card reader). The cardholder would manually complete the merchant check out form (or use other non-chip method) and will be prompted by the ACS to manually enter secret #3 if the issuer chose this approach.

Preferred Payment Network

Figure 14:
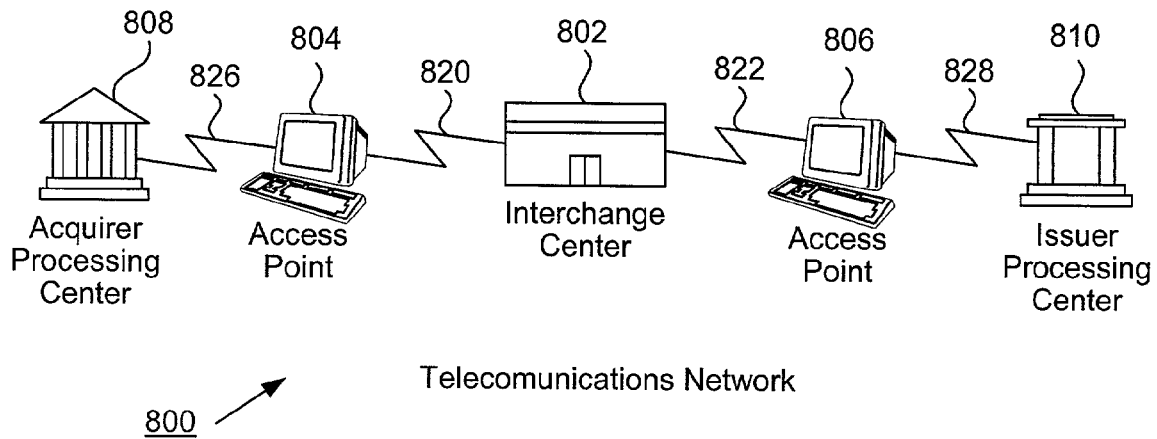
FIG. 14 illustrates a telecommunications network suitable for implementing an embodiment of the present invention.

FIG. 14 illustrates a telecommunications network 800 suitable for implementing an embodiment of the present invention. The present invention may make use of any suitable telecommunications network and may involve different hardware, different software and/or different protocols then those discussed below. The below-described network is a preferred embodiment of the telecommunications network 126 of FIG. 1. Network 800 is a global telecommunications network that supports purchase and cash transactions using any bankcard, travel and entertainment cards, and other private label and proprietary cards. The network also supports ATM transactions for other networks, transactions using paper checks, transactions using smart cards and transactions using other financial instruments.

These transactions are processed through the network's authorization, clearing and settlement services. Authorization is when an issuer approves or declines a sales transaction before a purchase is finalized or cash is dispersed. Clearing is when a transaction is delivered from an acquirer to an issuer for posting to the customer's account. Settlement is the process of calculating and determining the net financial position of each member for all transactions that are cleared. The actual exchange of funds is a separate process.

Transactions can be authorized, cleared and settled as either a dual message or a single message transaction. A dual message transaction is sent twice—the first time with only information needed for an authorization decision, an again later with additional information for clearing and settlement. A single message transaction is sent once for authorization and contains clearing and settlement information as well. Typically, authorization, clearing and settlement all occur on-line.

The main components of telecommunications network 800 are interchange centers 802, access points 804, 806 and processing centers 808 and 810. Other entities such as drawee banks and third party authorizing agents may also connect to the network through an access point. An interchange center is a data processing center that may be located anywhere in the world. In one embodiment, there are two in the United States and one each in the United Kingdom and in Japan. Each interchange center houses the computer system that performs the network transaction processing. The interchange center serves as the control point for the telecommunication facilities of the network, which comprise high speed leased lines or satellite connections based on IBM SNA protocol. Preferable, lines 820 and 822 that connect an interchange center to remote entities use dedicated high-bandwidth telephone circuits or satellite connections based on the IBM SNA-LU0 communication protocol. Messages are sent over these lines using any suitable implementation of the ISO 8583 standard.

An access point 804 or 806 is typically a small computer system located at a processing center that interfaces between the center's host computer and the interchange center. The access point facilitates the transmission of messages and files between the host and the interchange center supporting the authorization, clearing and settlement of transaction. Links 826 and 828 are typically local links within a center and use a proprietary message format as prefer by the center.

A data processing center (such as is located within an acquirer, issuer, or other entity) houses processing systems that support merchant and business locations and maintains customer data and billing systems. Preferably, each processing center is linked to one or two interchange centers. Processors are connected to the closest interchange, and if the network experiences interruptions, the network automatically routes transactions to a secondary interchange center. Each interchange center is also linked to all of the other interchange centers. This linking enables processing centers to communicate with each other through one or more interchange centers. Also, processing centers can access the networks of other programs through the interchange center. Further, the network ensures that all links have multiple backups. The connection from one point of the network to another is not usually a fixed link; instead, the interchange center chooses the best possible path at the time of any given transmission. Rerouting around any faulty link occurs automatically.

Figure 15:
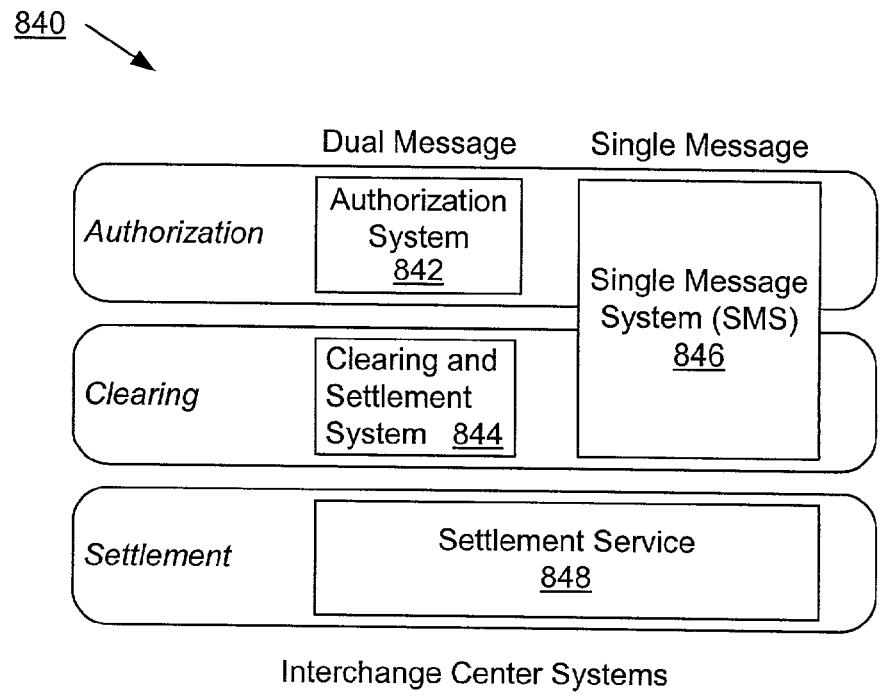
FIG. 15 illustrates systems housed within an interchange center to provide online and offline transaction processing.

FIG. 15 illustrates systems 840 housed within an interchange center to provide on-line and off-line transaction processing. For dual message transaction, authorization system 842 provides authorization. System 842 supports on-line and off-line functions, and its file includes internal systems tables, a customer database and a merchant central file. The on-line functions of system 842 support dual message authorization processing. This processing involves routing, cardholder and card verification and stand-in processing, and other functions such as file maintenance. Off-line functions including reporting, billing, and generating recovery bulletins. Reporting includes authorization reports, exception file and advice file reports, POS reports and billing reports. A bridge from system 842 to system 846 makes it possible for members using system 842 to communicate with members using system 846 and access the SMS gateways to outside networks.

Clearing and settlement system 844 clears and settles previously authorized dual message transactions. Operating six days a week on a global basis, system 844 collects financial and non-financial information and distributes reports between members. It also calculates fees, charges and settlement totals and produces reports to help with reconciliation. A bridge forms an interchange between system 844 processing centers and system 846 processing centers.

Single message system 846 processes full financial transactions. System 846 can also process dual message authorization and clearing transactions, and communicates with system 842 using a bridge and accesses outside networks as required. System 846 processes Visa, Plus Interlink and other card transactions. The SMS files comprise internal system tables that control system access and processing, and the cardholder database, which contains files of cardholder data used for PIN verification and stand-in processing authorization. System 846 on-line functions perform real-time cardholder transaction processing and exception processing for authorization as well as full financial transactions. System 846 also accumulates reconciliation and settlement totals. System 846 off-line functions process settlement and funds transfer requests and provide settlement and activities reporting. Settlement service 848 consolidates the settlement functions of system 844 and 846, including Interlink, into a single service for all products and services. Clearing continues to be performed separately by system 844 and system 846.

Figure 16:
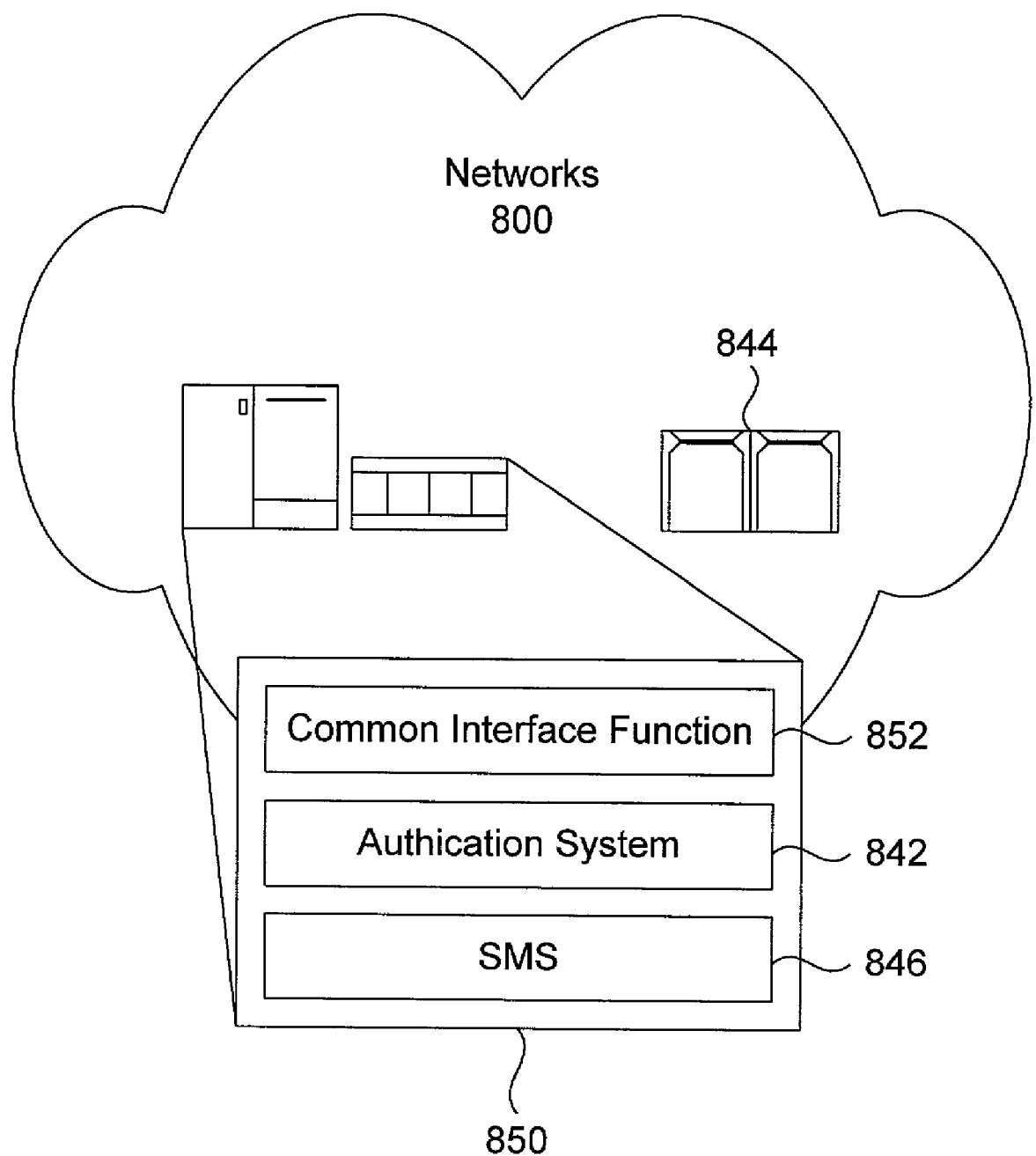
FIG. 16 illustrates another view of the components of the telecommunications network.

FIG. 16 illustrates another view of the components of telecommunications network 800. Integrated payment system 850 is the primary system for processing all on-line authorization and financial request transactions. System 850 reports both dual message and single message processing. In both cases, settlement occurs separately. The three main software components are the common interface function 852, authorization system 842 and single message system 846.

Common interface function 852 determines the processing required for each message received at an interchange center. It chooses the appropriate routing, based on the source of the message (system 842, 844 or 846), the type of processing request and the processing network. This component performs initial message editing, and, when necessary, parses the message and ensures that the content complies with basic message construction rules. Function 852 routes messages to their system 842 or system 846 destinations.

Computer System Embodiment

Figure 17A:
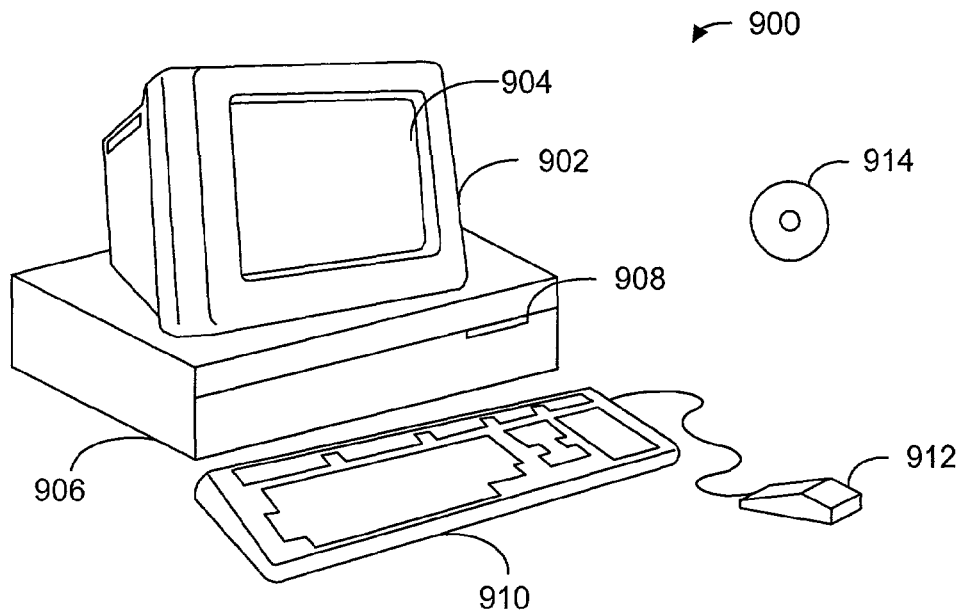
FIGS. 17A and 17B illustrate a computer system suitable for implementing embodiments of the present invention.
Figure 17B:
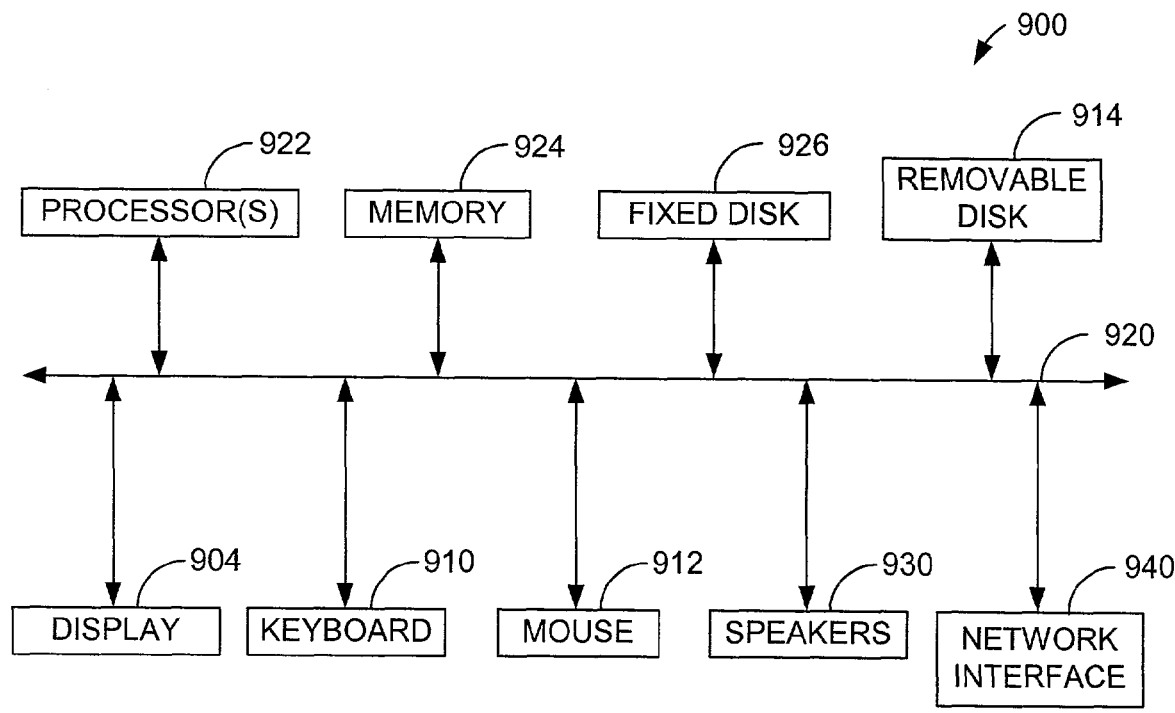

FIGS. 17A and 17B illustrate a computer system 900 suitable for implementing embodiments of the present invention. FIG. 17A shows one possible physical form of the computer system. Of course, the computer system may have many physical forms ranging from an integrated circuit, a printed circuit board and a small handheld device up to a huge super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 17B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

While this invention has been described in terms of several preferred embodiments, there are alteration, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

We claim:

1. A method wherein an account issuer authenticates, for the benefit of a third party, that a customer using an account during an online transaction with said third party is the actual owner of said account, said third party desiring verification as to the identity of said customer before proceeding with said online transaction with said customer, said method comprising:
receiving, by said issuer, authentication information concerning said customer;
verifying, by said issuer during a registration process, the identity of said customer as the owner of said account and associating a designated password with said account;
receiving a verify enrollment request message at an access control server operated by said issuer during said online transaction as to whether said customer account is registered;
sending a verify enrollment response message back to said third party indicating that said customer account is registered;
receiving an authentication request message at said access control server from said third party during said online transaction, said message requesting verification of the identity of said customer, said authentication request message being routed via an Internet browser of a computer of said customer and being sent after said verify enrollment response message;
requesting over a network, by said issuer from said customer during said online transaction, of an identity-authenticating password;
verifying, by said issuer, that said identity-authenticating password from said customer matches said password previously designated for said account; and
notifying said third party over said network during said online transaction, by said issuer, that said customer is the actual owner of said account when said identity-authenticating password entered by said customer matches the password that was previously designated for said account, said notifying being routed via said Internet browser of said computer of said customer, whereby said issuer authenticates said customer for said third party during said online transaction.

2. A method as recited in claim 1 wherein said issuer is an issuer financial institution and said third party is an online merchant, whereby said online merchant conducts an online financial transaction with said customer, and wherein said account of said customer is maintained by said issuer financial institution.

3. A method as recited in claim 1 wherein the access control server determines if said customer account is registered by verifying that said customer account is contained in a database of enrolled customer accounts.

4. A method as recited in claim 1 further comprising:
sending said verify enrollment request message from said third party to a directory server to verify that said customer account is registered.

5. A method as recited in claim 1 further comprising:
including within said verify enrollment response message an Internet address for said access control server, whereby said Internet address for said access control server allows said third party to communicate with said access control server.

6. A method as recited in claim 1 further comprising:
reviewing a memory device controlled by said third party to verify that said customer account is registered.

7. A method as recited in claim 1 further comprising:
generating, by said issuer, a digitally-signed transaction receipt using a signature key of said issuer; and
sending, by said issuer, said digitally-signed transaction receipt to said third party, whereby said digitally-signed transaction receipt confirms to said third party that the identity of said customer has been authenticated.

8. A method as recited in claim 7 wherein said transaction receipt includes a number associated with said customer account, a transaction payment amount, and a transaction payment date.

9. A method as recited in claim 7 further comprising:
verifying, by said third party, said digitally signed transaction receipt such that said third party is assured that said transaction receipt was sent from a specific issuer.

10. A method as recited in claim 1 further comprising:
sending, by said issuer, a card authentication verification value to said third party, the card authentication verification value containing a unique value for said customer account and a specific payment transaction, whereby said card authentication verification value uniquely identifies a specific authenticated payment transaction.

11. A method as recited in claim 1 further comprising:
sending, by said third party, of an authorization message to an issuer financial institution to verify said customer account has adequate credit for a requested purchase.

12. A method as recited in claim 1 wherein said first step of verifying further comprising:
receiving, by said issuer, said authentication information entered at an enrollment Internet web site by said customer;
verifying, by said issuer, that said enrollment information substantially matches information contained within a pre-existing database of customer information; and
storing said customer account information in a database for enrolled customer accounts.

13. A method as recited in claim 1 further comprising:
accessing a web site of said third party by said customer using an Internet browser of said customer computer;
redirecting said Internet browser of said customer computer from said web site to said access control server of said issuer, whereby said issuer receives said identity-authenticating password; and
redirecting said Internet browser of said customer computer from said access control server back to said web site of said third party.

14. A method as recited in claim 1 wherein said access control server receives said customer authentication information and said designated password from said issuer during said registration process, whereby said customer need not go through a formal registration process.

15. A method as recited in claim 1 wherein said access control server receives said customer authentication information and said designated password from said customer during said registration process, whereby said registration process is a formal registration process.

16. A method as recited in claim 1 wherein said online transaction is a payment transaction.

17. A method performed by an authentication service wherein an account issuer authenticates, for the benefit of a third party, that a customer using an account during an online transaction with said third party is the actual owner of said account, said method comprising:

receiving, by said issuer, authentication information concerning said customer;

verifying, by said issuer during a registration process, the identity of said customer as the owner of said account and associating a designated password with said account;

performing a verification process by said third party during said online transaction to determine whether said customer account is registered;

receiving an indication responsive to said performing at said third party indicating that said customer account is registered;

sending an authentication request message via a customer computer from a third-party software module over a network during said online transaction, said request message being sent after said verification process;

receiving said authentication request message at an access control server that is operated by said issuer;

requesting over said network, by said issuer, of a password from said customer;

verifying, by said issuer, that said password entered by said customer matches said password previously designated for said account; and sending over said network, by said issuer, an authentication response message to a third-party software module, said authentication response message containing an authentication status indicator, said response message being routed via said computer of said customer, whereby said issuer authenticates said customer for said third party.

18. A method as recited in claim 17 wherein said online transaction is a payment transaction.

19. A method as recited in claim 17 wherein said third-party software module sends said authentication request message to said access control server by way of a browser in said customer computer, and wherein said issuer sends said response message to said third-party software module by way of said browser in said customer computer.

20. A method as recited in claim 17 wherein said third-party software module sends said authentication request message to a software module of said customer computer and wherein said customer computer then sends said authentication request message to said access control server.

21. A method as recited in claim 17 further comprising:
redirecting an Internet browser of said customer computer from said third party to said access control server of said issuer, whereby said issuer receives said entered password; and
redirecting said Internet browser of said customer computer from said access control server back to said third party.

22. A method as recited in claim 17 wherein said performing includes
querying a directory server by said third party to determine if said customer account corresponds to a record of said directory server.

23. A method as recited in claim 17 wherein said performing includes
directly querying said access control server by said third party.

24. A method as recited in claim 17 wherein said performing includes
checking a cache memory of said third party.

25. A method performed by a customer computer used with an authentication service wherein an issuer financial institution authenticates, for the benefit of a third party, that a customer using an account during an online transaction with said third party is the actual owner of said account, said method comprising:

sending enrollment information to an enrollment web site by said customer during a registration process so that said issuer verifies the identity of said customer as the owner of said account;

supplying a password to be designated for said account during said registration process;

performing a verification process by said third party during said online transaction to determine whether said customer account is registered with said authentication service;

receiving an indication responsive to said performing at said third party indicating that said customer account is registered;

receiving, by said customer computer after said verification process, an authentication request message from said third party during said online transaction that requests the identity of said customer be authenticated;

sending said authentication request message to an access control server operated by said issuer financial institution, said customer having an account with said issuer financial institution;

receiving a request from said access control server for said customer to enter a password used to verify the identity of said customer during said online transaction;

supplying said password used to verify identity; and facilitating the sending of an authentication response message from said access control server to said third party via said customer computer regarding the verification of the identity of said customer, whereby said access control server verifies the identity of said customer for said third party.

26. A method as recited in claim 25 wherein said online transaction is a payment transaction.

27. A method as recited in claim 25 further comprising:
accessing a web site of said third party by said customer using an Internet browser of said customer computer;
redirecting said Internet browser of said customer computer from said web site to said access control server of said issuer, whereby said issuer receives said password; and
redirecting said Internet browser of said computer from said access control server back to said web site of said third party.

28. A method as recited in claim 25 wherein said performing includes
querying a directory server by said third party to determine if said customer account corresponds to a record of said directory server.

29. A method as recited in claim 25 wherein said performing includes
directly querying said access control server by said third party.

30. A method as recited in claim 25 wherein said performing includes
checking a cache memory of said third party.

31. A method performed by an authentication service wherein an account issuer authenticates a customer for the benefit of a third party, said method comprising:
receiving, by said issuer, authentication information concerning said customer;
verifying, by said issuer during a registration process, the identity of said customer as the owner of said account and associating a designated password with said account;

receiving a request over a network from a customer computer to perform an online financial transaction with said third party;

performing a verification process by said third party during said online transaction to determine whether said customer account is enrolled in said authentication service;

receiving an indication responsive to said performing at said third party indicating that said customer account is enrolled;

sending an authentication request message from said third party via said customer computer over a network during said financial transaction, said authentication request message destined for a computer of said issuer and being sent after said performing;

receiving an authentication response message from said computer of said issuer via said customer computer during said financial transaction, said authentication response message indicating the authenticity of said customer, said authenticity being based upon a password supplied by said customer to said computer of said issuer during said financial transaction and upon said password previously designated for said account, whereby said issuer authenticates said customer for said third party.

32. A method as recited in claim 31 wherein said financial transaction is a payment transaction.

33. A method as recited in claim 31 wherein said third party sends said authentication request message to said issuer computer by way of a browser in said customer computer, and wherein said issuer sends said response message to said third party by way of said browser in said customer computer.

34. A method as recited in claim 31 wherein said third party sends said authentication request message to a software module of said customer computer and wherein said customer computer then sends said authentication request message to said issuer computer.

35. A method as recited in claim 31 further comprising:
performing said sending by redirecting an Internet browser of said customer computer from a web site of said third party to said computer of said issuer, whereby said issuer receives said password; and performing said second step of receiving by redirecting said Internet browser of said customer computer from said computer of said issuer back to said web site of said third party.

36. A method as recited in claim 31 wherein said performing includes
querying a directory server by said third party to determine if said customer account corresponds to a record of said directory server.

37. A method as recited in claim 31 wherein said performing includes
directly querying said issuer computer by said third party.

38. A method as recited in claim 31 wherein said performing includes
checking a cache memory of said third party.

* * * * *